US012703419B2

(12) United States Patent
Battlogg et al.

(10) Patent No.: US 12,703,419 B2
(45) Date of Patent: Aug. 11, 2026

(54) STEERING INPUT DEVICE FOR SPECIFYING A STEERING MOVEMENT ACCORDING TO THE STEER-BY-WIRE CONCEPT AND METHOD FOR OPERATING A STEERING INPUT DEVICE

(71) Applicant: INVENTUS Engineering GmbH, St. Anton i.M. (AT)

(72) Inventors: Stefan Battlogg, St. Anton i.M. (AT); Philipp Dönz, Silbertal (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 0 days.

(21) Appl. No.: 18/857,083

(22) PCT Filed: Apr. 12, 2023

(86) PCT No.: PCT/EP2023/059504
§ 371 (c)(1),
(2) Date: Oct. 15, 2024

(87) PCT Pub. No.: WO2023/198742
PCT Pub. Date: Oct. 19, 2023

(65) Prior Publication Data

US 2025/0249949 A1 Aug. 7, 2025

(30) Foreign Application Priority Data

Apr. 12, 2022 (DE) ..................... 10 2022 108 880.4
Jun. 27, 2022 (DE) ..................... 10 2022 115 932.9
Aug. 25, 2022 (DE) ..................... 10 2022 121 533.4

(51) Int. Cl.
*B62D 5/00* (2006.01)

(52) U.S. Cl.
CPC .................................. *B62D 5/006* (2013.01)

(58) Field of Classification Search
CPC ........ B62D 15/025; B62D 5/003; B62D 5/04; B62D 5/0409; B62D 5/005; B62D 5/006;
(Continued)

(56) References Cited

U.S. PATENT DOCUMENTS 6,612,393 B2 * 9/2003 Bohner .................... B62D 5/06
180/407
6,899,196 B2 5/2005 Husain et al.
(Continued)

FOREIGN PATENT DOCUMENTS

CN 108407887 A 8/2018
CN 112896286 A 6/2021
(Continued)

*Primary Examiner* — Logan M Kraft
*Assistant Examiner* — Johnny H Hoang
(74) *Attorney, Agent, or Firm* — Laurence A. Greenberg; Werner H. Stemer; Ralph E. Locher

(57) ABSTRACT

A steering input device for controlling a vehicle according to the steer-by-wire concept. A power train has a moveable steering unit and a drive device with a drive motor for generating a torque acting on the steering unit. The power train also has a controllable magnetorheological coupling device with two coupling components that can be rotated relative to one another. The coupling device is connected in series with the drive device in the power train. A torque can be transmitted between the drive device and the steering unit by the coupling device and can be changed in a targeted manner.

30 Claims, 16 Drawing Sheets

(58) Field of Classification Search
CPC .......... F16H 1/16; F16D 57/002; F16D 37/02; F16D 2037/001; F16D 2037/005; F16D 2037/007; G05G 1/08; G05G 5/03; B60K 35/10; B60K 2360/126
USPC ................... 701/41–47; 188/267.2; 192/21.5
See application file for complete search history.

(56) References Cited

U.S. PATENT DOCUMENTS 11,505,234 B2 11/2022 Hwang et al.
2002/0108804 A1* 8/2002 Park ....................... B62D 5/005 180/444
2002/0161499 A1* 10/2002 Radamis ................ B62D 5/003 701/41
2003/0146037 A1 8/2003 Menjak et al.
2005/0082107 A1* 4/2005 Husain .................. B62D 5/006 180/402
2006/0197741 A1* 9/2006 Biggadike ................ G05G 5/03 345/156
2007/0080036 A1* 4/2007 Elie ....................... F16D 37/008 192/84.951
2012/0085613 A1* 4/2012 Bose ........................ H02K 7/14 192/21.5
2013/0175132 A1* 7/2013 Battlogg ............ F16C 33/6688 192/21.5
2018/0346014 A1 12/2018 Beyerlein et al.
2018/0362075 A1* 12/2018 Lee ...................... B62D 5/0421
2023/0392667 A1* 12/2023 Kim .................... F16C 32/0637
2023/0406401 A1* 12/2023 Battlogg ................ B62D 5/005
2024/0101184 A1 3/2024 Battlogg

FOREIGN PATENT DOCUMENTS

DE 10221241 A1 11/2003
DE 10221242 A1 11/2003
DE 102004050014 A1 6/2005
DE 102016206610 A1 10/2017
DE 102018200590 A1 3/2019
EP 1698538 B1 10/2008
WO 2022123090 A1 6/2022

* cited by examiner 300
305
400
1
23b
426
325
446
22
26
23a
23
13
301

STEERING INPUT DEVICE FOR SPECIFYING A STEERING MOVEMENT ACCORDING TO THE STEER-BY-WIRE CONCEPT AND METHOD FOR OPERATING A STEERING INPUT DEVICE

FIELD AND BACKGROUND OF THE INVENTION

The invention relates to a steering input device for specifying a steering movement according to the steer-by-wire concept with at least one power train. The power train comprises at least one movable steering unit, in particular a steering wheel, and at least one drive device with at least one drive motor for generating a torque acting on the steering unit.

High demands are placed on such steering control devices. For example, precise steering feedback and play-free or jerk-free steering behavior, especially around the center position, as well as very smooth, harmonious steering behavior are required. The user should e.g., notice on the steering wheel of a car when the front wheels build up grip, i.e., he should feel the ground. This preferably requires little installation space and power and is also as noiseless as possible. In addition, the steering input device must provide high torques or be able to counteract the manual steering movement (the torque then corresponds to a braking torque). This is the case, for example, for hard end stops when the steering wheel turns quickly (i.e., high kinetic energy when the steering wheel is turned quickly when maneuvering, for example at 1000°/s). Due to the proliferation of steering wheel controls, steering wheels are becoming heavier, increasing kinetic energy. High torques or braking moments are also required when the driver (or user) holds on to the steering wheel when getting in or out of the vehicle (entry/exit assistance). Such braking moments can be, for example, 25 Newton meters, 35 Newton meters or more.

At the same time, the steering input device must also be able to provide very low torques or braking torques (less than 1 Newton meter, preferably less than 0.5 Newton meter), for example if only very slight steering movements are made to maintain the lane when driving straight ahead. Low torques are also necessary for steering movements around the center position or when changing direction (e.g., 1 to 3 Newton meters) so that the vehicle can be guided smoothly, and a curved route can be driven quickly and harmoniously. Overall, sensitive and precise steering is only possible with very smooth steering. This means that the user does not tire as quickly. For this purpose, for example, torques of less than one Newton meter are desired.

Thus, a steering control device (particularly on the manual control point or the steering unit) should be able to generate high-quality torques between 0.1 Nm and 25 Nm, which corresponds to a spread (maximum torque divided by minimum torque) of 250.

Furthermore, the required torques or braking torques should be adjustable as far as possible without noticeable transitions or continuously and with high control quality. In addition, the torques should have the shortest possible response times (or switching times) and, for example, can be set in less than 100 ms, preferably less than 20, particularly preferably less than 10 ms. The installation space for the steering control device is usually very limited, for example in a dashboard in modern vehicles with a head-up display.

The aforementioned requirements are very difficult to achieve technologically. One problem is that high torques or braking torques usually require corresponding drive motor or brake sizes, which in turn disadvantageously increases the basic torque (also referred to as idle torque). However, a high basic torque meets the requirements of smooth steering and good controllability.

For example, electrically or electromagnetically actuated friction brakes are known, which offer a high maximum braking torque. However, the friction surfaces required to achieve the braking torque, when inactive or de-energized, cause unfavorably high basic friction, for example one Newton meter of basic friction at 20 Newton meters of maximum braking torque.

Furthermore, steering systems with an electric motor have become known, which is coupled to the steering wheel either directly or via a reduction gear or (toothed) belt. Such directly attached electric motors generate, for example, active braking torques (nominal torques) of up to eight Newton meters and short-term passive braking torques of up to 25 Newton meters. However, due to the correspondingly high braking torque, such electric motors are very large and heavy, as well as sluggish (mass moment of inertia) and often expensive. Due to the large operating range, the controllability at low braking torques needs to be improved.

Electric motors that are mounted parallel to the steering line (indirect arrangement) via belt drives, for example, do not really offer a solution, as the additional belt drive, pulleys and brackets require space and cause flexibility, play and additional costs. In addition, these additional components are prone to errors and therefore pose a safety risk.

Since electric motors in the steering system have to provide the high braking torque primarily at low speeds, the power requirement or power requirement is also disadvantageously high. At the same time, electric motors have very poor efficiency at low speeds or when at a standstill (for example to provide an end stop) and therefore often heat up very quickly. This in turn worsens the efficiency as the coil resistance increases. This causes the engine to heat up even faster and everything increases, and the power requirement increases rises quickly and very strongly.

A steer-by-wire steering system for a motor vehicle with a three-phase synchronous motor as a direct drive for actively moving the steering wheel and with a magnetorheological brake is known from DE 10 221 241 A1. The stator of the synchronous motor is fixed to a dashboard. The rotor is non-rotatably connected to an actuating shaft (steering shaft) via a hollow shaft. The actuating shaft is connected to the steering wheel in a rotationally fixed manner. The magnetorheological brake has a ring magnet and a brake disk as well as a gap arranged between them for the magnetorheological fluid. The ring magnet is attached to the stator side. The brake disc is arranged on the actuating shaft in a rotationally fixed manner.

Other steering devices with magnetorheological brakes with magnetorheological fluids have become known in the prior art, e.g., the MRF brake from Lord Corporation in different sizes (5 Nm, 12 Nm, 20 Nm): https://www.lord.com/products-and-solutions/steer-by-wire-tactile-feedback-device. These are also used as "steer-by-wire tactile feedback". These brakes work in themselves. A disadvantage of these MRF brakes, however, is their relatively high basic friction (basic torque) in relation to the maximum torque (working range). The working range of a 5 Nm According to the Lord website/specification, the brake is 0.5 to 5 Nm (factor 10), with the 12 Nm brake the working range is between 1 Nm and 12 Nm (factor 12) and with the 20 Nm brake. The working range is between 1 Nm and 20 Nm (factor 20). This relatively small working range is not sufficient for many applications, which is why these series products are primarily used for coarser or coarse motor applications (including operation usually with gloves, as in industry, on agricultural machinery, on forklifts . . . ).

For (predominantly) fine motor applications such as steering a passenger car, a significantly lower basic torque is required. At the same time, a higher maximum torque is advantageous, i.e., a significantly larger working area. The high basic torque, in particular, quickly leads to fatigue when steering, for example, or it doesn't feel comfortable. However, the well-known magnetorheological brakes do not allow a large working range because the friction surfaces are too large. Smaller friction surfaces would reduce the basic torque, but the maximum torque would also be smaller, which would be unfavorable, especially in steering systems.

SUMMARY OF THE INVENTION

In contrast, the object of the present invention is to provide an improved steering input device. In particular, the steering input device should fulfill the previously discussed requirements as far as possible and preferably at the same time offer a reliable and safe function and be economical to produce.

This object is achieved by the steering input device and the method according to the invention. Preferred developments of the invention are also disclosed. Further advantages and features of the present invention emerge from the general description and from the description of the exemplary embodiments.

The steering input device according to the invention is used to specify a steering movement according to the steer-by-wire concept and in particular for controlling a vehicle. The steering input device can also be used to control a simulator device (e.g. racing simulator) or a computer simulation (so-called gaming). The steering input device comprises at least one power train with at least one (manually) movable (in particular, rotatable) steering unit. The power train comprises at least one drive device with at least one drive motor for generating a torque (drive torque) acting on the steering unit. The drive motor is, in particular, designed to be controllable so that the torque can be adjusted. The power train includes at least one controllable magnetorheological coupling device. The coupling device comprises at least two coupling components that can be rotated relative to one another. The clutch device is connected serially (in other words: in series) to the drive device in the power train. The clutch device and the drive device are preferably connected in series to one another and/or in series to the steering unit. In particular, the coupling device and the drive device are not connected parallel to one another and/or not parallel to the steering unit. A torque that can be transmitted between the drive device and the steering unit can be changed in a targeted manner by means of the coupling device. In particular, a force flow between the drive device and the steering unit can be changed in a targeted manner by means of the coupling device.

The steering control device can be used in motor vehicles (e.g. cars, trucks, ON-highway vehicles), aircraft, planes (including drones), ships, boats, in agricultural and forestry technology, for example tractors or combine harvesters, harvesters and others field machines possible (OFF-Highway vehicles). It can also be used in construction or moving work machines and, for example, forklifts or similar machines, or in simulators for simulating vehicle control (gaming; sim racing; computer peripherals . . . ). The steering input device can, in particular, also be used for at least partially or completely autonomous vehicles.

The steering unit is, in particular, a steering wheel. The steering unit can alternatively also be designed as a steering wheel, yoke, handlebar or handlebar rod, control knob, control horn, control pedal, control lever or as a joystick or as a control wheel. Other types of movable steering units for steering/controlling vehicles are also possible. The movement of the steering unit is, in particular, a rotary movement. In particular, the steering unit is movable in at least two directions of rotation and is preferably rotatable. However, pivoting or the like is also possible. The steering input device can comprise at least one transmission means which is suitable and designed to convert the movement of the steering unit into a rotary movement of one of the clutch components.

Depending on the operating state of the steering input device, the torque can occur, in particular, as a drive torque (so-called active torque) or as a braking torque (so-called passive torque) in the power train. For example, the drive motor can actively move the steering unit with a specific drive torque. The drive motor and/or the clutch device can in particular brake a (manual) movement of the steering unit with a specific braking torque. For this purpose, the drive motor, for example, applies a torque that must be overcome when steering in order to be able to move the steering unit. In other words, the drive torque of the drive motor can be felt in particular as braking torque on the steering unit. The (in particular continuously controllable) clutch device can be used to adjust in particular how much of the drive torque of the drive motor is applied to the steering unit as braking torque. In particular, the coupling device can be adjusted so that no drive torque at all or the entire drive torque and a targeted portion of the drive torque is applied to the steering unit as a braking torque (in particular continuously adjustable).

The steering control device according to the invention offers many advantages. A significant advantage lies in the serial arrangement of the coupling device and the drive device in the power line. The steering movement can thus be influenced very precisely and sensitively with the magnetorheological coupling device and with a very low basic torque (particularly preferably <0.1 Nm). Due to the serial connection, it doesn't matter if the drive device for sensitive steering movements actually has far too high a basic torque or the control quality is too low. In the serial circuit, the drive device only needs to be designed so that it can actively move the steering unit and provides a sufficiently high counterforce (torque support) for the clutch device. This allows a cost-effective and structurally simple drive device to be used. Thanks to the serial circuit, it is even possible to compensate for an unfavorable influence of the drive device on the steering precision by specifically controlling the clutch device. The coupling device required for this can generally be implemented without great economic effort. Overall, the invention can therefore fulfill the previously discussed requirements particularly well and reliably and at the same time can be produced economically.

The steering unit is preferably only movable together with at least one of the at least two clutch components. In particular, the steering unit is movable together with at least one of the at least two clutch components. In particular, the steering unit is connected in a rotationally fixed manner to at least one of the at least two clutch components. In particular, the steering unit is connected in a rotationally fixed manner to the at least one clutch component even when the at least two clutch components are rotated relative to one another. When the steering unit is moved, at least one of the clutch components preferably always rotates.

Preferably, the steering unit can be actively moved by means of the drive device. In particular, the drive device generates a torque for this purpose. Such a torque can also be referred to as driving torque or active torque. Preferably, the drive torque transmitted (or transferable) to the steering unit can be adjusted by means of the clutch device. This is particularly advantageous because it . . . . Magnetorheological coupling device can influence the steering unit much more precisely and quickly than would be possible, for example, by adjusting the drive torque of the drive device.

In particular, a manual movement of the steering unit can be subjected to a torque that counteracts the movement. Such a torque can also be referred to as braking torque. In particular, the mobility of the steering unit can be specifically braked. The braking torque can preferably be adjusted using the clutch device. The drive device preferably serves as a torque support for the clutch device. The drive device is used in particular to transmit the braking torque in the power line. The drive device serves in particular to transmit the braking torque from the clutch device to a vehicle-side torque support and/or to transmit the braking torque from the steering unit to the clutch device.

The drive device can be active (i.e., if it serves as a torque support for the clutch device) and apply a torque (drive torque) or be passive (for example switched off). The drive device can comprise at least one transmission device, which serves as a (in particular self-locking) torque support for the clutch device.

In all embodiments, it is preferred that the torque that can be transmitted by the clutch device in the power train can be adjusted and preferably changed in a targeted manner by means of at least one control device. The control device is particularly suitable and designed to control the clutch device in such a way that it transmits only a defined part of the torque occurring in the power train and/or that it transmits the entire torque and preferably the entire torque coming from the drive device (in particular the drive torque). The control device is particularly suitable and designed to control the clutch device in such a way that the steering unit is braked with a defined torque (braking torque).

In a preferred and advantageous embodiment, the drive device comprises at least one gear device. The transmission device can in particular be driven by the at least one drive motor. The transmission device is preferably designed to be self-locking. In particular, the transmission device is designed to be self-locking, so that the transmission device can receive torque from the drive motor and pass it on (in particular to the clutch device and/or steering unit), but cannot move the drive motor and preferably cannot rotate it. In particular, the self-locking transmission device is suitable and designed not to transmit any torque from the clutch device to the drive motor.

This offers the advantage that the maximum braking torque for the steering movement does not depend on the basic torque of the drive motor or this activity depends. So, the braking torque can e.g., can be adjusted solely by the clutch device that is particularly suitable for this purpose, while one of the two clutch components is reliably supported on the self-locking transmission device even at high braking torques. Even when the drive motor is switched off, undesirable “co-rotation” is prevented. A self-locking transmission without the serial switching of the clutch device in the power train presented here would lead to a safety-related blocking of the steering unit if the drive motor failed. Then the vehicle or the vehicle would be too Steering/steering object can no longer be controlled/steered. By serially connecting the self-locking gear device and its drive motor to the coupling device, this problem is overcome in an advantageous and safety-related manner.

The transmission device preferably includes at least one drive member. The drive member is, in particular, drivable and preferably rotatable by the drive motor. The drive member is preferably designed as a worm shaft or includes at least one. The transmission device preferably includes at least one output member. The output member is, in particular, drivable and preferably rotatable by the drive member. The output member is, in particular, designed as a worm wheel or at least includes one. In particular, the drive member is connected downstream of the drive motor and, in particular, upstream of the output member. In particular, the output member is connected downstream of the drive member and upstream of the coupling device.

In particular, the drive member and the drive motor cannot be driven by the output member due to the self-locking of the transmission device. In particular, the transmission device can be driven by the drive member but cannot be driven by the output member. In particular, the drive member can be driven by the drive motor and can preferably be rotated. In particular, the drive member drives the output member. In particular, at least one of the at least two coupling components is connected to the output member in a rotationally fixed manner and is preferably rotatable by the output member. In particular, the drive member cannot be driven by the coupling device. In particular, the drive motor cannot be driven and, in particular, rotated by the coupling device.

In particular, the transmission device comprises at least one worm gear with at least one worm wheel and with at least one worm shaft. The worm shaft can also be called a snail. The worm shaft can be single or multi-start.

Preferably, at least one of the at least two coupling components is coupled to the output member in a rotationally fixed manner. The coupling component is preferably a worm wheel educated. It is also possible and preferred for the coupling component to be arranged at least partially radially inside the worm wheel. This offers a significant saving in installation space. In particular, the worm wheel is formed or arranged at least in sections radially on the outside of the clutch component. In particular, the coupling component and the worm wheel are arranged coaxially with one another. In particular, the worm wheel surrounds the coupling component at least in sections. However, the coupling component and the worm wheel can also be connected to one another in another way, for example via at least one shaft or the like. The coupling component and the worm wheel can be in contact with one another in the axial direction or can be axially spaced apart from one another.

The coupling components are preferably arranged coaxially with one another at least in sections. In particular, one clutch component surrounds the other clutch component. In particular, a coupling component is at least partially arranged radially within the other coupling component. Preferably, the radially outer coupling component is rotationally coupled to the output member. In particular, the radially outer coupling component is designed as a worm wheel or is at least partially arranged radially inside of the worm wheel. This offers another significant saving in installation space.

It is possible and advantageous for the drive device to comprise at least two drive motors. In particular, at least one drive member is assigned to each of the drive motors. In particular, the drive members drive the same output member. In particular, the drive motors each include at least one worm shaft. In particular, the worm shafts of the drive motors act on the same worm wheel. This offers a compact and inexpensive implementation of a particularly powerful drive. That is, for example, it is an advantage in commercial vehicles that require high torque on the steering wheel.

In a preferred and advantageous embodiment, the coupling device is arranged or connected between the steering unit and the drive device in the power train. The drive device is arranged or connected in particular between the coupling device and the abutment structure in the power train. In particular, the coupling device is arranged spatially between the steering unit and the drive device. In particular, the drive device is arranged spatially between the coupling device and the abutment structure. In particular, the frictional connection between the drive device and the steering unit can be changed by means of the coupling device.

Preferably, one of the at least two coupling components is connected to the steering unit in a rotationally fixed manner. Another of the at least two clutch components is preferably drivable by the drive device. The drive device is in particular attached to a torque support and preferably to an abutment structure. In particular, the steering unit can only be moved together with one clutch component.

In particular, the other clutch component is connected upstream of the one clutch component and downstream of the drive device. The other clutch component is arranged in particular between the drive device and the one clutch component in the power train. switched. In particular, a radially outer clutch component is coupled to the drive device. In particular, a radially inner coupling component is coupled to the steering unit.

In a likewise preferred and advantageous embodiment, the drive device is arranged or connected between the clutch device and the steering unit in the power train. The clutch device is arranged or connected, in particular, between the drive device and the torque support in the power train. In particular, the clutch device is attached to the abutment structure for this purpose. In particular, the drive device is arranged spatially between the clutch device and the steering unit. In particular, the clutch device is arranged spatially between the drive device and the abutment structure. In particular, the frictional connection between the drive device and the abutment structure can be adjusted by means of the clutch device.

Preferably, one of the at least two coupling components is connected on the vehicle side for torque support. In particular, the coupling component is secured to the abutment structure in a rotationally fixed manner. Preferably, another of the at least two clutch components is designed as a torque support for the drive device. In particular, the other coupling component is coupled to the drive device in a rotationally fixed manner. In particular, the other clutch component is only connected to the steering unit indirectly (indirectly) via the drive device. In particular, the other clutch component and the steering unit are rotatable relative to one another. In particular, the other clutch component is connected to the steering unit via the drive motor and the self-locking transmission device. In particular, the radially outer coupling component is connected to the drive device and is indirectly coupled to the steering unit. In particular, the radially inner coupling component is bound to the abutment structure for torque support.

In this embodiment, it is preferred that the drive device is supported on the other coupling component when it drives the steering unit. In particular, the other clutch component offers torque support for the drive device when the drive device is the steering unit drives. In particular, none of the clutch components are (directly) connected to the steering unit. In this embodiment, it is also preferred that a torque from a manual steering movement is passed from the steering unit via the self-locking transmission device to the drive motor and further to the other clutch component. With regard to the torque of the manual steering movement, the steering unit is, so to speak, connected to the other coupling component in a rotationally fixed manner. In particular, the drive motor is attached to the steering unit. In particular, the steering unit can only be moved together with the drive motor. If the steering unit is moved during steering, the (entire) drive motor is also moved at the same time and in particular the transmission device is also moved. Due to the self-locking gear device between the drive motor and the clutch device, the other clutch component can only be moved together with the steering unit when the steering unit is moved manually. When the steering unit is moved by the drive motor, the steering unit moves in particular relative to the other clutch component and in particular to both clutch components. The drive motor preferably also moves relative to both clutch components.

In a preferred and advantageous development, the steering unit provides at least one receiving space. In particular, the steering unit at least partially encloses the receiving space. Preferably, the drive device and the coupling device are at least partially and in particular at least predominantly and particularly preferably completely arranged in the receiving space. In particular, at least one of the coupling components is arranged in the receiving space. In particular, this coupling component can be rotated relative to the receiving space. In particular, at least one other of the coupling components is only partially or predominantly or completely arranged in the receiving space. In particular, a stator of the drive motor is in the receiving space connected in a rotationally fixed manner. The receiving space is in particular at least partially surrounded by a housing of the steering unit and in particular by a steering wheel housing.

It is possible and advantageous for the drive device and the coupling device to be arranged at least partially at a distance from the steering unit. In particular, they are arranged or can be arranged in the correct assembly position below and/or in the intended forward direction of travel in front of an instrument panel of the vehicle. In the area of the steering unit, no installation space is required for the drive device and the coupling device, so that a steering wheel, for example, can be considerably more compact. Due to the spaced arrangement, the drive device and the coupling device do not have to be moved if the steering unit is actively pulled away from the driver by a safety system in the event of a frontal collision.

The steering unit is preferably designed to be retractable at least for autonomous ferry operation. This means that the person in the driver's seat is not restricted by the steering unit. The steering unit can also be designed to be retractable for other purposes. In particular, the steering unit is designed to be motorically retractable and mobile and/or laterally movable. For example, the steering unit can be moved toward and away from the driver's seat. In the case of a movable steering unit, the embodiment described above is particularly advantageous, in which the coupling device and the drive device are arranged at a distance from the steering unit. It is also advantageous if the components are at least partially accommodated in a receiving space of the steering unit. In this way, sufficient space can be provided for moving the steering unit. It is possible for the drive motor to also provide the torque for retracting and/or extending the steering unit.

It is preferred and advantageous to have at least one malfunction protection being provided and being suitable and designed to apply a targeted torque (braking torque or malfunction braking torque) to the mobility of the steering unit at least in the event of a malfunction of the coupling device, so that the steering unit can neither be blocked nor moved without resistance (manually). In particular, the fault protection can provide a torque of at least 0.5 Nm. In particular, the torque is less than 5 Nm and preferably less than three Newton meters. An advantageous torque is, for example, between 1 Nm and 2 Nm.

Depending on the size of the steering unit (in particular the diameter of the steering wheel or steering wheel), the necessary or maximum torques can vary, which feel good to the user or are acceptable from a safety perspective. A larger steering wheel diameter usually requires or results in higher torques. The tangential forces of the operator (operating forces) on the diameter of the steering device (point of application) are decisive here. With a braking torque of 3.5 Nm and a diameter of 330 mm of the steering control device, tangential forces (operating forces) of approx. 21 N result. Steering control devices in cars usually have a steering wheel diameter in this range (300 to 400 mm). Trucks usually have a steering wheel diameter between 400 and 500 mm, which means that higher torques are permissible or tactilely possible (e.g. tangential/operating force=21 N; steering wheel diameter=500 mm. Approx. 5.25 Nm maximum braking torque possible).

It is possible for the malfunction protection to provide haptic feedback or feedback that can be perceived on the steering unit as an indication of the malfunction. In particular, the haptic feedback occurs when the steering unit is moved manually (passively). For example, the feedback is noticeable as a rattling or jerking during steering, which can be generated by quickly turning the power on/off.

In particular, fault prevention is suitable for this purpose designed to mechanically couple the coupling components to one another in the event of a fault, so that a minimum friction occurs between the coupling components and/or the coupling components are connected in a rotationally fixed manner. In particular, at least one actuator is provided for mechanical coupling. For this purpose, the fault protection includes in particular at least one securing bolt, which mechanically connects the coupling components to one another. In particular, in the event of a fault, the securing bolt is applied to the coupling components in a form-fitting and/or force-fitting manner. The mobility of the steering unit is limited in the event of a fault, for example, made possible by rotating the drive device. In particular, the drive device is then not designed to be self-locking.

The fault protection preferably comprises at least one permanent magnet device. In particular, the permanent magnet device has a magnetic field in a magnetic circuit, which slows down the mobility of the clutch components with a defined torque (braking torque). In particular, the magnetic field influences the magnetorheological medium. Preferably, the magnetic field of the permanent magnet device can be reduced or even eliminated during normal operation by an electrical coil device. In particular, the magnetic field (magnetic flux density) in the magnetic circuit generated by the permanent magnet device is reduced or canceled by means of the (opposite) magnetic field generated by the electrical coil device. It is also possible that the magnetic field can be amplified by the electrical coil device during normal operation. The permanent magnet device can comprise at least one permanent magnet or can be designed as such. In the event of a malfunction, it can be achieved very reliably and at the same time in a structurally uncomplicated manner so that the steering unit can neither be blocked nor moved without resistance.

The permanent magnet device can be provided by a remanence device. The remanence device is used in particular to generate residual magnetism or residual magnetization. In particular, the use of special materials such as AlNico is intended to be provided. In particular, the remanence device is suitable and designed to specifically magnetize at least one component of the steering input device and in particular of the clutch device, so that this component then provides a magnetic field (e.g., in the manner of a switchable permanent magnet). In particular, the remanence device is suitable and designed to demagnetize the component again. In particular, the remanence device comprises at least one electrical coil device. This coil device can be provided by the coil device, which is intended to influence the magnetorheological medium in normal operation. However, it is also possible that the coil device for influencing the magnetorheological medium and the coil device for the remanence device are designed separately.

It is advantageous and preferred that the malfunction protection comprises at least one electrical energy storage device for supplying energy to the coupling device in the event of an malfunction. In particular, the energy storage provides at least the energy for an electrical coil device for influencing a magnetorheological medium and/or for a remanence device and/or for at least one actuator of the fault prevention system. The energy storage device can include at least one capacitor device and/or at least one rechargeable battery and/or at least one battery. With such an energy storage device, the magnetorheological medium can be specifically influenced even if the power supply is interrupted, so that the steering unit can neither be blocked nor moved without resistance.

In particular, the energy storage is arranged (at least partially) within the clutch device. This is preferred energy storage is arranged protected inside, i.e., in the (outer) housing, of the coupling device, so that no cables or connections between the energy storage and the coupling device lie outside the housing and so cannot be damaged by external forces. In particular, the energy storage is surrounded by a housing of the coupling device.

In all versions, it is possible and advantageous for the fault protection system to be provided at least partially by the components of the coupling device. For example, the fault protection is provided by the coupling components and the gap and the magnetorheological medium of the coupling device. In all configurations, however, it is also possible and advantageous for the malfunction protection to include its own braking device (designed separately from the clutch device). In particular, the braking device is dimensioned smaller than the clutch device.

In particular, the braking device is magnetorheologically designed. In particular, the braking device has at least two braking components that can be rotated relative to one another and a gap formed between them with a magnetorheological medium. In particular, at least one of the brake components is rotatably connected to the steering shaft by the steering unit and preferably in a rotationally fixed manner. In particular, at least one other of the brake components is supported in a rotationally fixed manner on the abutment structure (e.g., indirectly via the housing device). The medium can, in particular, be specifically influenced in order to apply a braking torque to the movement of the brake components. For example, the braking device has the previously described permanent magnet device and/or remanence device and/or at least one electrical coil device (can also be referred to as an additional coil device). In this way, the steering unit can be braked in a targeted manner in the event of a fault. In normal operation the influences braking device does not control the steering movement.

In an advantageous development, the steering input device comprises at least one controllable steering lock for blocking the mobility of the steering unit. In particular, the steering lock is designed as an exit aid. In particular, the steering lock can be used if necessary and in particular when the vehicle is at a standstill and/or when the door is open and/or when the steering wheel is, for example, is turned by children when stationary and with the ignition switched off. In particular, the steering lock is designed to prevent the steering unit from over-rotating. The blocking of the mobility is intended in particular for the manual operating forces or support forces expected during normal operation.

The steering lock is preferably provided by the coupling device. For this purpose, the coupling device is designed, in particular, in such a way that it can transmit a torque of more than 25 Newton meters. The torques depend heavily on the steering wheel diameter (distance of force application to the pivot point) and the application and the 25 Nm represents a standard value for state-of-the-art cars (e.g., steering wheel diameter between 300 and 400 mm). For a truck with a noticeably larger steering wheel diameter (e.g., 400 to 500 mm) and the steering wheel is used to pull the driver up into the cockpit when getting in, torques of 40, 60 or 80 Nm May also be necessary.

If the steering wheel diameter is larger (e.g., truck or rudder of a sailing ship), the basic torque may also be higher because the operating force at the control point (e.g., hand) is multiplied by the same distance. The drive device is preferably equipped with a self-locking gear device. For this purpose, the coupling device can be designed with a permanent magnet device and/or a remanence device and/or an electrical energy storage device (as before for the fault protection described).

The steering lock can include at least one (mechanical) blocking device. In particular, the blocking device is suitable and designed to block the mobility of the steering unit independently of the coupling device. In particular, the blocking device is connected downstream of the steering unit in the power train and upstream of the clutch device. In particular, the blocking device enables a positive and/or non-positive blocking of the mobility of the steering unit. The blocking device can be provided by the mechanically designed fault protection described above.

In all embodiments, the steering input device can comprise at least one actuator device. The steering input device then corresponds, so to speak, to the manual control point and the actuator device is then the actuator. The actuator device is used to (physically) implement a steering movement carried out by the steering unit (in particular into a movement of the vehicle and/or another object and/or a simulated virtual object). The actuator device is used, for example, to move at least one wheel and/or rudder. In particular, the steering unit and the actuator device are only operatively connected according to the steer-by-wire concept and, in particular, are only operatively connected electrically or electronically in normal operation. It is possible that a mechanical connection is provided in an emergency operation. The applicant reserves the right to claim a steering system which includes a steering input device and an actuator device.

Preferably, at least one gap is formed between the coupling components (so-called effective gap). In particular, the gap is at least partially filled with a magnetorheological medium. In particular, the gap is designed to be circumferential. In particular, the gap is located at least in sections (seen in the radial direction) between the coupling components. In particular, the magnetorheological medium can be influenced in a targeted manner by means of at least one electrical coil device, which in particular generates a magnetic field in a magnetic circuit, in order to be able to adjust the mobility of the coupling components relative to one another. In particular, the coupling device comprises at least one magnetic circuit or can provide one. The magnetic circuit is in particular a closed path of a magnetic flux within the coupling device. The magnetic circuit preferably runs through the gap and in particular also through the coupling components. In particular, the power flow between the clutch components is specifically increased and reduced by means of the electrical coil device. In particular, the medium can be influenced by the coil device in such a way that the mobility of the coupling components relative to one another can be subjected to a specific torque and/or released. In particular, the coil device is controlled by a control device.

In particular, the coil device is attached to one of the coupling components. In particular, the coupling component has at least one coil holder for this purpose. The coil device can also be attached independently of the coupling components, e.g., on a component that is fixed relative to the coupling components. In particular, the coil device is supplied with electrical energy via the steering shaft and/or via a line running in the steering shaft and/or via the fixed component (e.g., the housing device).

A coil device is understood to mean, in particular, any type of electrical device for the (infinitely) controllable generation of a magnetic field (generation of a magnetic flux density in the magnetic circuit). The coil device is preferred in terms of energy efficiency, short switching times and less Inductance optimized by the degree of filling, the shape, diameter and material of the coil wires and their arrangement. To achieve even shorter switching times, a boost device can be used that works with higher or high voltages. The normally required coil voltage is sometimes and briefly exceeded several times (voltage jump). Such optimizations also make the coupling device very energy efficient. The power requirement to achieve a clutch torque of 10 Nm is e.g., under one watt.

In particular, the steering input device comprises at least one sensor device for detecting a relative position of the clutch components to one another and/or for detecting a position of the steering unit. In particular, the steering input device comprises at least one sensor device for detecting forces and/or torques. In particular, the coupling device can be controlled depending on a sensor signal.

A switching time of the clutch device is preferably less than 10 ms. A switching time is in particular the time between an inactive state (no transferable torque; in particular no magnetic field in the magnetic circuit) and an active state in which at least 90% of the maximum transferable torque can be transferred.

Preferably, a basic torque of the clutch device is less than 0.1 Nm and preferably less than 0.05 Nm and particularly preferably less than 0.02 Nm. The basic moment is due in particular to technical reasons, for example due to frictional forces or inertial forces.

The method according to the invention serves to operate a steering input device and preferably a steering input device as described above. In this case, a torque (so-called power flow) that can be transmitted between the drive device and the steering unit is specifically changed by means of the coupling device while the drive device actively moves the steering unit and/or while the drive device supports the torque of a manual movement of the steering unit. In particular, the power flow between the drive device and the steering unit is specifically changed by means of the coupling device. In particular, the power flow is changed depending on an operating state of the vehicle (e.g. when stationary; slow or fast driving on tar, loose ground, ice, snow, sand, over curbs, driving over the center line . . . ). Preferably, the coupling device regulates the power flow from the drive device to the steering unit and/or from the steering unit to the drive device. In particular, the power flow can also be adjusted when the drive motor is running and/or during a manual movement. In particular, the power flow can be adjusted in real time. In particular, the steering unit is moved manually to steer a vehicle. In particular, the movement of the steering unit is braked with the clutch device, while the torque that occurs in the power train is supported and/or actively supported with the drive device.

The method according to the invention also solves the previously set task particularly advantageously. In this way, the steering movements can be influenced considerably more precisely and more quickly than could be done using the drive device.

In particular, the steering unit is actively moved by means of the drive device and the clutch device is controlled in such a way that it can fully transmit the torque applied by the drive device in the power train. In particular, the clutch device is controlled in such a way that it only transmits the torque applied by the drive device up to a defined limit in the power train. In particular, the limit is infinitely adjustable. In particular, the steering input device described above is suitable and designed to carry out the method according to the invention. For this purpose, the steering input device in particular comprises at least one control device. In particular, the method is designed so that the previously described steering input device and preferably also its configurations can be operated afterwards.

In an advantageous embodiment, it is provided that the coupling device only enables the flow of force between the drive device and the steering unit after a start-up phase of the drive device, preferably the drive motor. In particular, the power flow is only made possible when a minimum speed of the drive motor has been reached. In particular, the power flow between the drive device and the steering unit is at least partially and preferably completely separated during the start-up phase and in particular before the minimum speed is reached. This enables a shorter reaction/switching time, saving energy and at the same time offers a better feel for the steering.

Preferably, torque peaks in the power flow are at least partially compensated or smoothed by means of the clutch device. In particular, torque peaks caused by load changes in the drive device (e.g., change in direction, speed changes, acceleration, deceleration, switching off, switching on, etc.) are compensated for by the clutch device.

Preferably, the clutch device regulates the power flow between the drive device and the steering unit in such a way that torque fluctuations and/or rotational speed ripple of a drive motor are at least partially compensated for. In particular, the compensation takes place in real time.

In particular, the coupling device generates haptic feedback during a movement of the steering unit, which can be felt on the steering unit (very quick power on/off). In particular, the haptic feedback is generated independently of a torque of the drive device.

In an advantageous embodiment, the coupling device can be designed as described for the magnetorheological braking device in the patent application PCT/EP2021/085570. The steering input device described there comprises a braking device with two brake components that can be rotated relative to one another. The relative mobility of the brake components can be continuously adjusted from completely blocked to completely freely movable. For use in the clutch device, it is preferably provided that the brake components are each connected in a rotationally fixed manner to one of the clutch components. An alternative and also advantageous embodiment can also be that the brake components each provide one of the clutch components. Therefore, the technical teaching of PCT/EP2021/085570 is incorporated into this description.

In the context of the present invention, a power flow is understood to mean, in particular, a torque flow or a torque transmission along the power train. In the context of the present invention, the term "power flow" can be replaced in particular by the expression "the torque that can be transmitted between the drive device and the steering unit". In particular, the torque that can be transmitted between the drive device and the steering unit can be specifically changed and preferably adjusted by means of the coupling device. The torque occurring in the power train can be used for a non-rotating and, for example, linear movement. In such an embodiment, the term "torque" can in particular be used synonymously with the term "work". In the context of the present invention, an arrangement of components in the power train is particularly concerned with their functional integration or circuit understood within the power train.

In particular, the coupling device is suitable and designed to transmit torque from the drive unit to the steering unit and/or from the steering unit to the drive unit. A power flow is understood in particular to mean the transmission of torque. A power flow is understood to mean, in particular, a non-positive connection of the individual components of the power train, so that a power flow is possible and a torque can be transmitted.

In order to enable the flow of power in the power train, in particular a frictional connection is established between the two clutch components. "Adhesive connection" here means the non-positive connection of the clutch components. In order to interrupt the power flow, a frictional connection between the clutch components is in particular interrupted. In order to specifically change the power flow, the frictional connection between the two clutch components is specifically adjusted in particular. This is done in particular by a Influencing the magnetorheological medium by means of at least one electrical coil device for generating a magnetic and/or electric field.

The torque that can be transmitted by the coupling device depends in particular on the condition, in particular the viscosity and/or viscous elasticity, of the magnetorheological medium. The state of the magnetorheological medium depends in particular on the magnetic and/or electric field to which it is exposed. In particular, the torque that can be transmitted by the clutch device can be adjusted by controlling the electrical coil device. The torque that can be transmitted between the two clutch components is in particular (only) dependent on a state of the magnetorheological medium arranged between the two clutch components. During normal operation, the torque is transferred from one clutch component to the other in particular exclusively via the magnetorheological medium.

The magnetorheological medium preferably comprises at least one metallic powder. In particular, the metallic powder has a volume fraction of 40%, at least 50% and preferably at least 60%. The metallic powder is preferably absorbed in a gaseous carrier medium and, for example, air. The metallic powder can also be contained in no carrier medium or any carrier medium. The metallic powder is particularly preferably provided with a coating or is mixed with friction-reduced materials (e.g. graphite; brass; bronze . . . ). By using such a medium, a particularly low basic torque can be achieved. At the same time, a particularly high maximum braking torque can be achieved due to the high-volume fraction. In addition, such a medium can be used with consistent properties at the temperatures expected for the steering control device. The metallic powder is preferably designed as a carbonyl iron powder (pure iron) or at least includes one. Other magnetorheologically responsive powders are also possible.

In particular, the power flow between the drive device and the steering unit can be adjusted to different torque values or torque ranges by means of the coupling device. In particular, the power flow between the drive device and the steering unit can be interrupted and established by means of the clutch device. In particular, the power flow can be interrupted and established by means of the coupling device and set to a value between "interrupted" and "established".

In particular, the power flow can be infinitely adjusted using the coupling device. In particular, the clutch device can be adjusted continuously from fully engaged to fully disengaged. In particular is that coupling direction is continuously variable. In particular, the power flow s can also be changed when the drive motor is running and/or during a movement of the steering unit.

The coupling device can be connected in series between the drive device and the steering unit and/or in series between the drive device and a vehicle-side torque support (in particular abutment structure). In particular, the coupling device can be used to change the force connection between the drive device and the steering unit and/or between the drive device and its torque support.

In particular, the power train includes at least one torque support. In particular, the power train is connected to an abutment structure on the vehicle side to support the torque occurring in the power train. In particular, the steering input device comprises at least one abutment structure. The abutment structure serves in particular as a torque support or is part of one. In particular, the abutment structure is firmly connected to the body or is part of the body series. The components of the power train can each be supported directly or indirectly (in particular via adjacent components) on the abutment structure.

The drive motor comprises in particular at least one stator and at least one rotor mounted rotatably relative to the stator. In particular, the torque support of the drive device takes place via the stator. For this purpose, the stator can be supported (attached) on the vehicle side and in particular on the abutment structure or on the steering unit. The rotor is coupled in particular to the transmission device and/or to the clutch device in order to drive it. An analog arrangement is also possible, in which the stator and rotor are swapped.

The drive motor includes in particular at least one Electric motor or is designed as such. The drive device can also include two or more drive motors. The drive device can also be used to return the steering unit to a basic position. The drive motor is in particular electric and, for example, designed as an electric motor. The electric motor can be a disc rotor, traveling wave or axial flux motor. Other types of electric drives are also possible. Additionally or alternatively, the drive device can also include at least one force accumulator and, for example, a spring or the like, in particular for resetting.

In particular, the steering unit is directly (directly) or indirectly coupled to (only) one of the at least two clutch components for transmitting the torque. For this purpose, the steering unit can be coupled to the clutch component directly and/or via the drive device and/or via a steering shaft that can be rotated by means of the steering unit. The steering unit is in particular connected in a rotationally fixed manner to the coupling component and/or to the steering shaft. It is possible that one of the coupling components is integrally connected to the steering shaft.

The applicant reserves the right to claim a steering control device for controlling a simulator device (e.g. for gaming or for a gaming bike . . . ) or a computer simulation. The steering input device is designed in particular as previously described for the steering input device according to the invention.

The steering input device, preferably the transmission device, in particular comprises at least one housing device. Preferably, the housing device has at least one fastening means for (rotatably) fastening to the abutment structure and/or to the steering unit. In particular, the clutch components and/or the steering shaft are rotatable relative to the housing device. In particular, the clutch components and/or the steering shaft are direct or indirect stored on the housing device. In particular, the drive device and preferably the drive motor is attached to the housing device. In particular, the housing device serves as a torque support for the drive device. In particular, the coupling device and/or the drive device is at least partially housed in the housing device.

It is possible and advantageous for the fault protection device, preferably its additional electrical coil device and/or remanence device, to be supplied with electrical energy via the housing device. It is possible that at least one electrical energy storage device for fault prevention is accommodated in the housing device. In particular, the fault protection is at least partially accommodated in the housing device.

The coil holder can each have at least one separate receiving space for the coil device and the additional coil device for the fault prevention system. The receiving spaces are particularly spatially separated. In particular, at least one partition wall is arranged between them, which is preferably designed to be magnetically conductive. It is also possible and advantageous for the coil holder to have at least one common receiving space for the coil device and the additional coil device.

The coil device and the additional coil device can be wound axially next to one another or coaxially to one another in the common receiving space. For example, the additional coil device is then arranged radially on the inside and surrounded by the coil device in the circumferential direction. A reverse arrangement is also possible. It is also possible and advantageous for the coil device and the additional coil device to be wound together in the common receiving space. Then the electrical conductors in the coils are arranged in a mixed manner, so to speak. In a particularly advantageous development, the coupling components are mounted so that they can rotate relative to a fixed component. In particular, the steering input device comprises at least one fixed component. The fixed component in particular provides the at least one coil receptacle for the coil device and/or the additional coil device. In particular, the coil device and/or the additional coil device is then not accommodated on the clutch components. In particular, the coil device and/or the additional coil device is then accommodated exclusively on the fixed component. The effective gap is then preferably formed (seen in the radial direction) between the rotating components. Preferably, the fixed component is arranged coaxially internally relative to the coupling components. However, it is also possible and advantageous for the fixed component to be arranged coaxially on the outside relative to the coupling components.

In particular, the clutch component, which is arranged between the fixed component and the other (outer) clutch component (so-called inner clutch component), is coupled to the drive device. The inner clutch component can be driven directly or indirectly (for example via the transmission device) by the drive device. In particular, the worm wheel is connected to the inner clutch component in a rotationally fixed manner. In particular, the fixed component or the outer coupling component is coupled (rotatably) to the steering unit. Then the outer coupling component or the fixed component is preferably attached to the abutment structure.

Further advantages and features of the present invention result from the exemplary embodiments, which are explained below with reference to the accompanying figures.

DETAILED DESCRIPTION OF THE INVENTION

Figure 1:
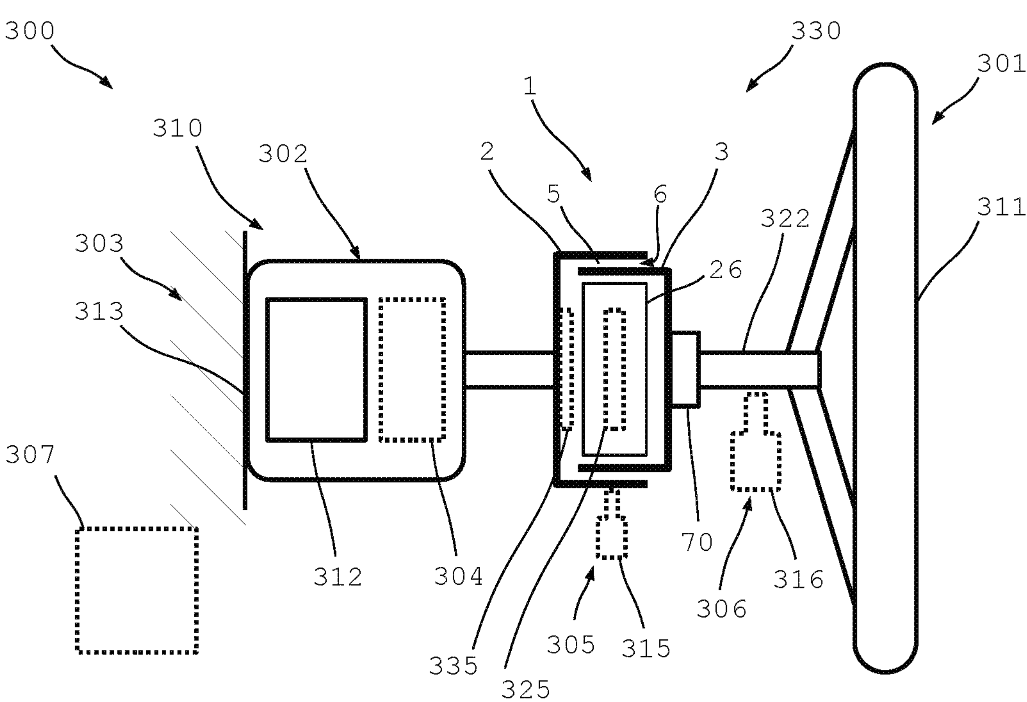
FIG. 1 is a purely schematic representation of a steering input device according to the invention.

FIG. 1 shows a steering input device according to the invention 300 for controlling a vehicle only partially shown here 330 based on the steer-by-wire concept. For this purpose, a steering unit 301, designed here as a steering wheel 311, is electrically or electronically connected to an actuator device 307. The actuator device 307 can, for example, adjust one or two or more wheels of the vehicle 330 and thereby convert the steering movement carried out with the steering unit 301 into a vehicle movement. The steering input device 300 is operated here according to the method according to the invention. For reasons of visibility, the dimensions or ratios are shown here and in the other figures purely schematically and, in particular, not to scale.

The movement or position of the steering unit 301 and/or the torque is detected here with a sensor device 70 and, for example, with a rotation angle sensor or torque sensor or a combination of both. Depending on a sensor signal from the sensor device 70, the steering movement is then implemented accordingly with the actuator device 307. Such a sensor device 70 is preferably also provided in the embodiments described below.

The steering control device 300 shown here can also be equipped with a steering unit 301 designed as a handlebar, steering wheel, control stick or the like. The actuator device 307 is designed accordingly for the respective steering unit and is then used, for example to operate a tail unit of an aircraft or a rudder of a ship. Likewise, the steering input devices 300 shown here can also be designed to control a simulator or a computer simulation. The steering input devices 300 presented here do not necessarily have to be in operative connection with an actuator device 307, which is used to control a real vehicle 330. In a simulator, the actuator device 307 can be accessed, for example can be dispensed with entirely. Rather, the signals from the steering input device 300 are converted into a simulated or virtual scenario. A steering unit 301 designed as a control horn 331 is shown in FIG. The steering control devices 300 presented here can be equipped with such a control horn 331 instead of the steering wheel 311, for example for controlling an aircraft.

The steering unit 301 is here integrated into a power train 310, which also includes a drive device 302 with an electric drive motor 312 and a magnetorheological clutch device 1. The drive device 302 serves to generate a torque acting on the steering unit 301 (force feedback), so that the steering unit 301 can be actively rotated to the right or left. With the drive device 302 and the coupling device 1, forces can be simulated when moving the steering unit 301, such as those encountered, for example would be noticeable on the steering unit 301 with mechanical steering (haptic feedback).

The clutch device 1 is connected in series (in series) to the drive device 302 in the power train 310 in order to be able to specifically change the power flow between the drive device 302 and the steering unit 301. The torque that can be transmitted from the drive device 302 to the steering unit 301 can be specifically adjusted using the clutch device 1. For this purpose, the coupling device 1 comprises two coupling components 2, 3 that can be rotated relative to one another, between which a circumferential gap 5 (can also be referred to as an effective gap, not drawn to scale for better clarity) is formed.

A magnetorheological medium 6 is arranged in the gap 5. The medium 6 can be influenced in a targeted manner using an electrical coil device 26. For this purpose, the coil device generates e.g., a magnetic field in a magnetic circuit. Depending on the influence of the medium 6, the mobility and the torques or (radial) forces to be transmitted change in the effective gap of the coupling components 2, 3 to one another. For example, the adhesion between the coupling components 2, 3 is increased if a stronger magnetic field is generated in the magnetic circuit and thus in the gap 5 with the electrical coil device 26. The relative mobility and the torque to be transmitted of the clutch components 2, 3 can be adjusted here from “freely rotatable” to “blocked” or from large slip to small slip. The blocking refers, for example, to the operating forces to be expected on the steering unit 301 or to the forces to be expected when supporting the steering unit 301 (operating forces=force at a certain diameter of the steering wheel or at the steering wheel rim or at the control point. Operating force×distance to the center of rotation=operating torque/force feedback).

The coupling device 1 is in terms of the electric coil (low inductance; wire cross section . . . ), the magnetic circuit (large cross sections, short magnetic circuit lengths, good transitions . . . ), the materials used (materials with very good magnetic conductivity and low residual magnetic field . . . ) and optimized by the operating principle (radial transition; >50% carbonyl iron powder) and a boost circuit in such a way that switching times <50 ms (milliseconds), preferably <20 ms and particularly preferably <10 ms, are achieved. Switching time means: Time between OFF state (switched off) until 90% of the maximum transferable torque is reached.

In the example shown here, the clutch device 1 is arranged between the steering unit 301 and the drive device 302 in the power train 110. The steering unit 301 is connected to the coupling component 3 in a rotationally fixed manner via a steering shaft 322. The coupling component 2 is connected to the drive device 302 in a rotationally fixed manner. For example, the clutch component 2 can be actively rotated by the drive motor 312.

The drive device 302 is here on an abutment structure 313 of the vehicle 330 attached. The abutment structure 113 is, for example, part of a vehicle body series. The abutment structure 313 serves here as a torque support 303 for the drive device 302. Depending on how the adhesion between the clutch components 2, 3 is set, the torque coming from the drive device 302 is transmitted completely or to a certain proportion or not at all to the steering unit 301.

With the clutch device 1, a manual movement of the steering unit 301 can be targeted with a torque or torque that counteracts the movement. Braking torque must be applied. The braking torque is adjusted via the adhesion between the two clutch components 2, 3. When the steering unit 301 is moved together with the clutch component 3, the clutch component 2 is supported on the drive device 302. The drive device 302 thus serves as a torque support 303 for the clutch device 1.

Due to the serial integration of the clutch device 1 into the power train 310, a particularly precise or sensitive feel for the steering can be implemented. On the one hand, the clutch device 1 can couple the drive torque of the drive device 302 into the power train 310 in such a way that it is necessary for an active movement or is available as a counter torque on the steering unit 301. On the other hand, the clutch device 1 can specifically compensate for the often very rough control behavior of the drive device 302 and, for example, superimpose with your own braking torques. This is considerably more economical and at the same time more reliable than using motors with finer control behavior. At the same time, the serial circuit offers a structurally simple and very fail-safe integration of the drive torque of the drive device 302 into the power train 310.

If the clutch components 2, 3 are coupled with the maximum adhesion, the possible braking torque also depends on the torque support 303 of the drive device 302. This Torque support 303 in turn depends on the torque that the drive motor 312 can generate. When the drive motor 312 or in the event of a fault, the torque support 303 then corresponds, for example, to a basic torque of the drive motor 312. This is in itself reliable and satisfactory.

In order to provide a particularly strong and even more reliable torque support 303 for the clutch device 1, the steering input device 300 shown here can be equipped with a self-locking gear device 304 in a further development. The gear device 304 is, for example, part of the drive device 302 and is connected between the drive motor 312 and the clutch device 1. Such a self-locking gear device 304 is presented in more detail with reference to the following figures.

The self-locking transmission device 304 can absorb torque from the drive motor 312 and pass it on to the clutch component 2. However, the transmission device 304 cannot pass on the torque coming from the clutch component 2 to the drive motor 312 and thereby move it.

The steering input device 300 can be equipped with a fault protection device 305 so that the steering unit 301 is not blocked in the event of a fault and cannot be moved without resistance. Such a fault protection device 305 can also be provided in the other embodiments of the steering input device 300 shown here.

The steering input device 300 shown here is equipped with various configurations of the malfunction protection 305, which can be provided alternatively or in addition to one another. For example, the clutch components 2, 3 are activated in the event of a fault by means of a Locking bolt 315 mechanically coupled to each other. To move the steering unit 301, the basic torque of the drive motor 312, for example, must then be applied. Then, in particular, no self-locking gear device 304 is provided.

Alternatively or additionally, the malfunction protection 305 can comprise a permanent magnet device 325. This creates a magnetic field in the gap 5 using a permanent magnet. This influences the medium 6 in such a way that the mobility of the coupling components 2, 3 is braked with a defined torque. During normal operation, the magnetic field of the permanent magnet device 325 is then superimposed and weakened or even eliminated by a corresponding magnetic field of the coil device 26. In addition or as an alternative to a permanent magnet, the permanent magnet device 325 can also be provided by a remanence device. This can magnetize a component in such a way that the component provides a magnetic field even without any additional power supply.

Alternatively or additionally, the malfunction protection 305 can have an electrical energy storage 335, which ensures an energy supply to the coupling device 1 and, for example, its coil device 26 in the event of a malfunction. Alternatively or additionally, the energy storage 335 can also provide the energy for the remanence device or for an actuator for the securing bolt 315.

Preferably, the components of the coupling device 1, through which the magnetic field extends during operation, are made of a material with good magnetic conductivity and a particularly low residual field (near zero) and in particular with no residual field (no residual magnetism–no magnetism remains in the magnetic circuit). For example, silicon steel and/or a soft magnetic cobalt-iron alloy (such as Vacoflux, a 17% or 49% cobalt-iron alloy) are used. These materials can be in solid or solid form or in powder form (e.g. for sintering).

The steering control device 300 can be equipped here with a steering lock 306, which is designed as an exit aid. This means that a person can support themselves on the steering unit 301 when getting out or getting in. Such a steering lock 306 can also be provided in the embodiments described below.

For example, the steering lock 306 includes a blocking device 316. The blocking device 116 is attached to a support structure of the vehicle 330, not shown here, and from there can positively block the mobility of the steering unit 301. The steering lock 306 works independently of the clutch device 1.

The steering lock 306 can also be provided by the clutch device 1. For example, this can transmit a torque of more than 25 Newton meters. The steering lock 306 can also be provided by the previously described malfunction protection 305.

Figure 2:
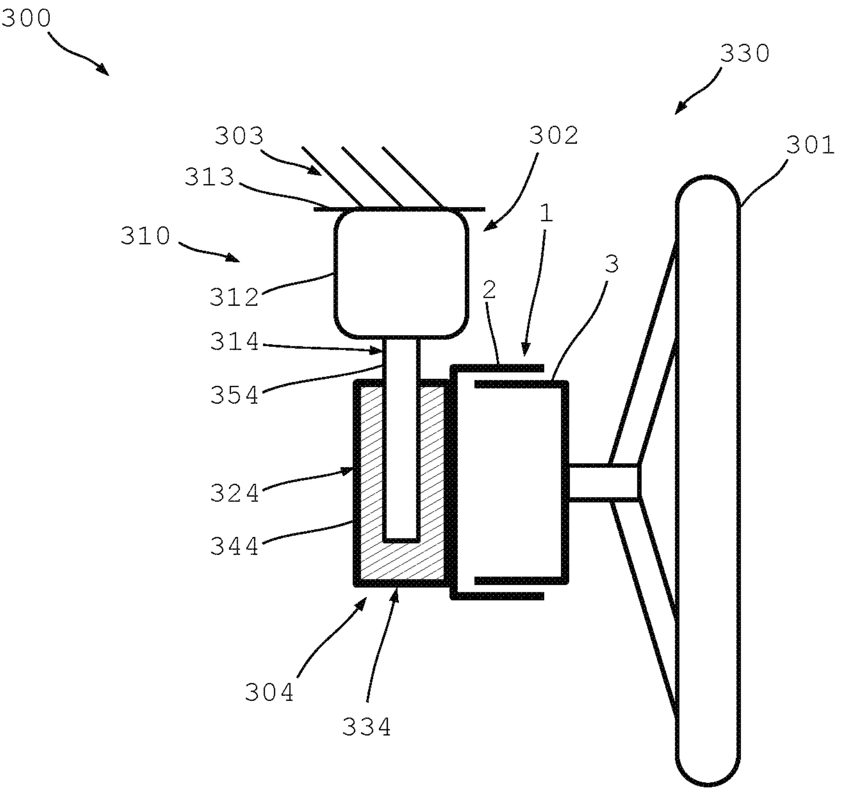
FIGS. 2-9 are purely schematic representations of further steering control devices according to the invention.

FIG. 2 shows a particularly compact design of the steering input device 300 with a self-locking gear device 304 with a drive member 314 and an output member 324. The coupling components 2, 3 are arranged coaxially to one another here.

The radially outer coupling component 2 is coupled in a rotationally fixed manner to the output member 324. The essential basic structure of the coupling device 1 is preferably as described with reference to FIG. 1.

The gear device 304 here is a worm gear 334. The drive member 314 is designed as a worm shaft 354 and is driven directly by the drive motor 312. For this purpose, the worm shaft 354 is, for example, firmly connected to a (rotor) shaft of the drive motor 312 or designed as such. The output member 324 is designed as a worm wheel 344 and meshes in the worm shaft 354.

The drive motor 312 is attached to the abutment structure 313 for torque support 303. The worm wheel 344 is here connected to the coupling component 2 in a rotationally fixed manner. This allows the drive motor 312 to actively rotate the clutch component 2. The clutch component 3 is connected to the steering unit 301 in a rotationally fixed manner. Due to the self-locking, the coupling component 2 is, so to speak, supported in a rotationally fixed manner on the worm gear 334 when a torque is introduced from the direction of the steering unit 301. The adhesion between the clutch components 2, 3 is then adjusted so that the steering unit 301 is braked with a desired braking torque or that a desired drive torque is applied to the steering unit 301.

Figure 3:
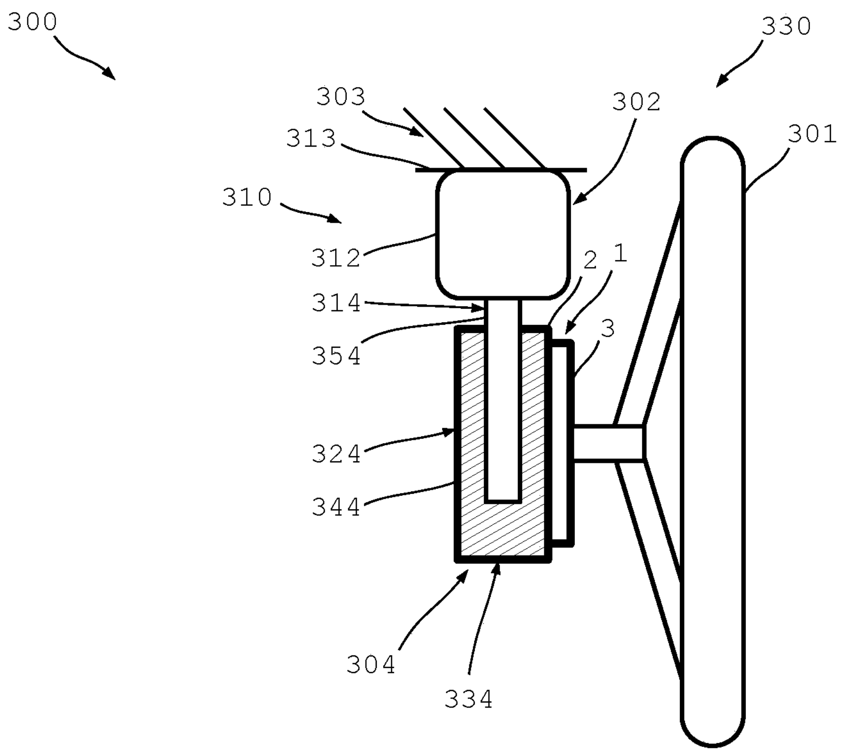

FIG. 3 shows an embodiment of the previously described steering control device 300, which requires particularly little installation space. For this purpose, the radially outer coupling component 2 is designed here as a worm wheel 344 or is arranged coaxially inside the worm wheel 344. This enables a particularly compact or short design of the power train 310.

Figure 4:
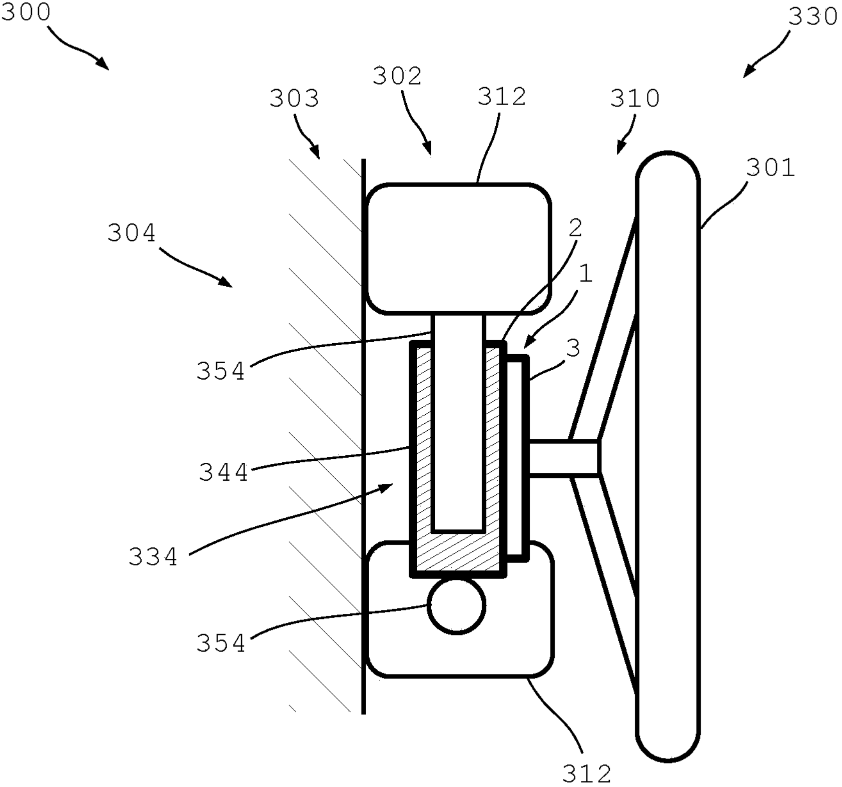

The steering control device 300 shown in FIG. 4 is equipped with a drive device 302 with two drive motors 312. A torque support 303 is provided here for both drive motors 312, for example the abutment structure 313. A drive member 314 is assigned to each of the drive motors 312, which is designed here as a worm shaft 354. Both drive members 314 drive the same output member 324, which is designed as a worm wheel 144. The radially outer clutch component 2 is designed as the worm wheel 344 or is arranged radially inside thereof.

Figure 5:
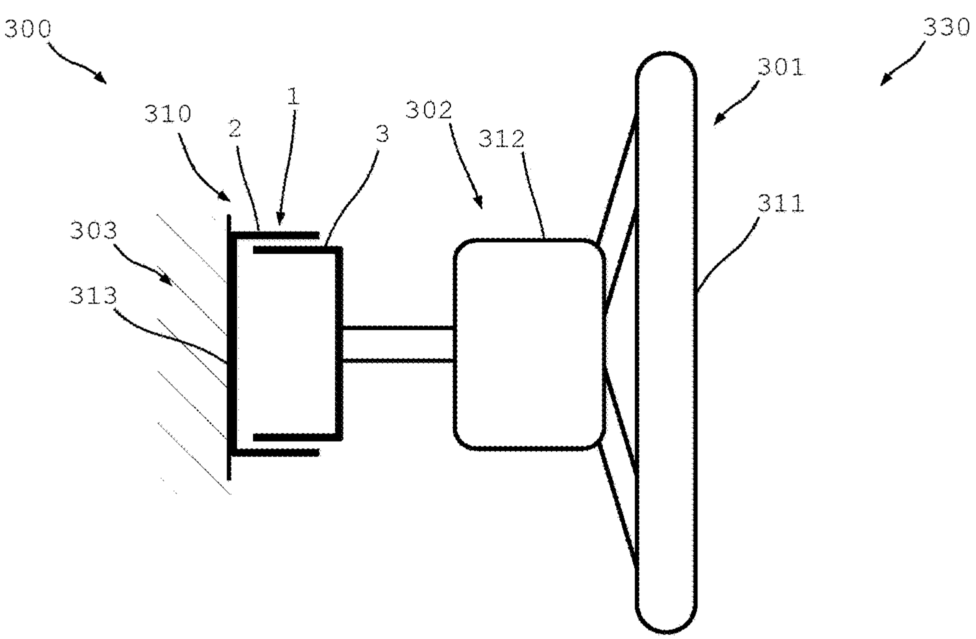

FIG. 5 shows a steering input device 300 according to the invention, in which the clutch device 1 is connected in series at a different position in the power train 310 than was previously described. The drive device 302 is here both functionally and spatially arranged between the clutch device 1 and the steering unit 301 in the power train. The coupling component 2 is attached to the abutment structure 313 in a rotationally fixed manner for torque support 303. A torque measuring unit could measure the reaction torque between the clutch component 2 and the torque support 303 (e.g. strain gauges, torque sensor . . . ).

The clutch component 3 serves here as a torque support 303 for the drive device 302. The drive motor 312 of the drive device 302 is firmly coupled to the steering unit 301 and drives it. For example, the drive motor 312 is attached with its stator to the steering unit 301 and with its rotor to the clutch component 3. The drive device 302 is essentially provided here by the drive motor 312. The drive device 302 can also be equipped with a e.g., self-locking gear device 304. The mode of operation is then, for example, analogous to the mode of operation shown in FIG. 6.

Figure 6:
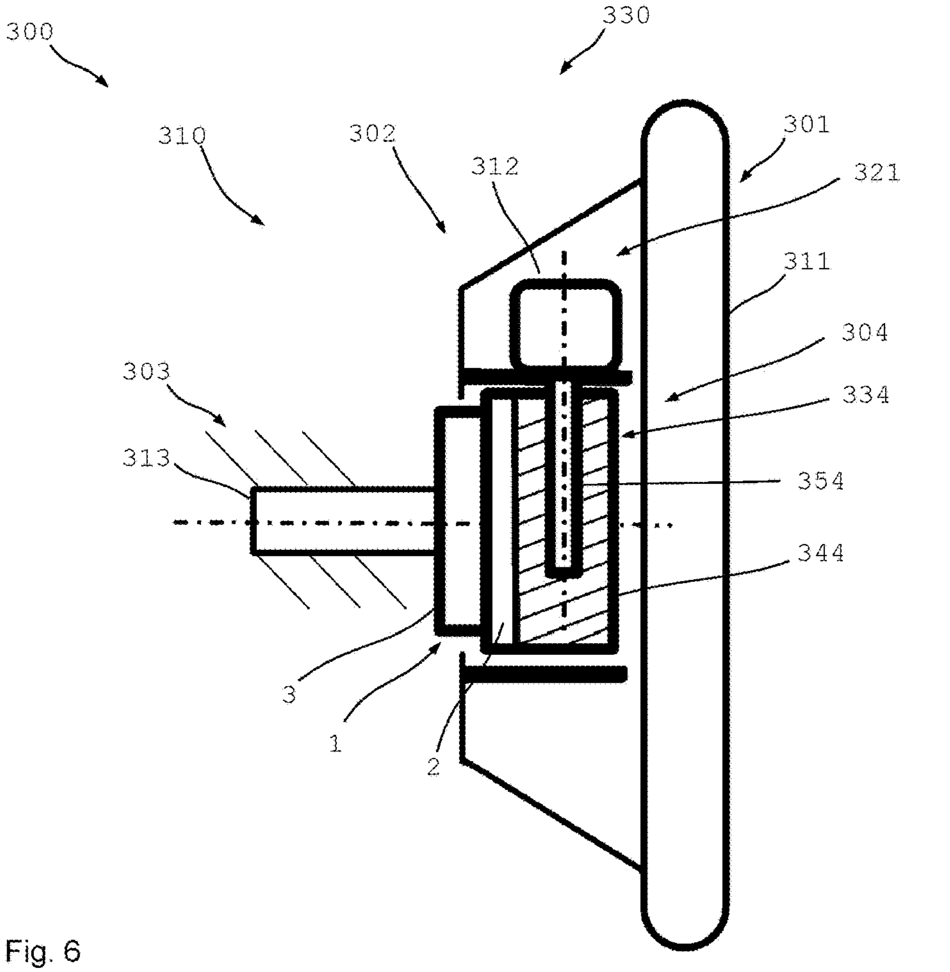

FIG. 6 shows a very compact version of the steering control device 300. The basic connection of the power train 310 is analogous to the connection shown in FIG. 5. The drive device 302 is arranged between the clutch device 1 and the steering unit 301 in the power train 310.

The radially inner coupling component 3 serves here as a torque support 303 and is connected to the abutment structure 313. For this purpose, the coupling component 3 is attached to the abutment structure 313, for example via a stub axle.

The radially outer clutch component 2 is designed as a worm wheel 344 or is arranged radially within one. The drive motor 312 is attached to the steering unit 301 and drives a worm shaft 354, which meshes in the worm wheel 344. Here, when the steering unit 301 is driven by the drive motor 312, it rotates relative to the clutch component 2. If the drive motor 312 is inactive, the self-locking gear device 304 prevents the clutch component 2 and the worm wheel 344 from rotating relative to the steering unit 301. The braking torque can then be generated solely with the clutch device 1.

The steering unit 301 here provides a receiving space 321 in which the drive device 302 together with the drive motor 312 and the transmission device 304 are accommodated. In addition, the radially outer coupling component 2 is arranged completely in the receiving space 321. The radially inner coupling component 3 is here partially accommodated in the receiving space 321. In an advantageous embodiment, the coupling component 3 can also be arranged completely in the receiving space 321.

Figure 7:
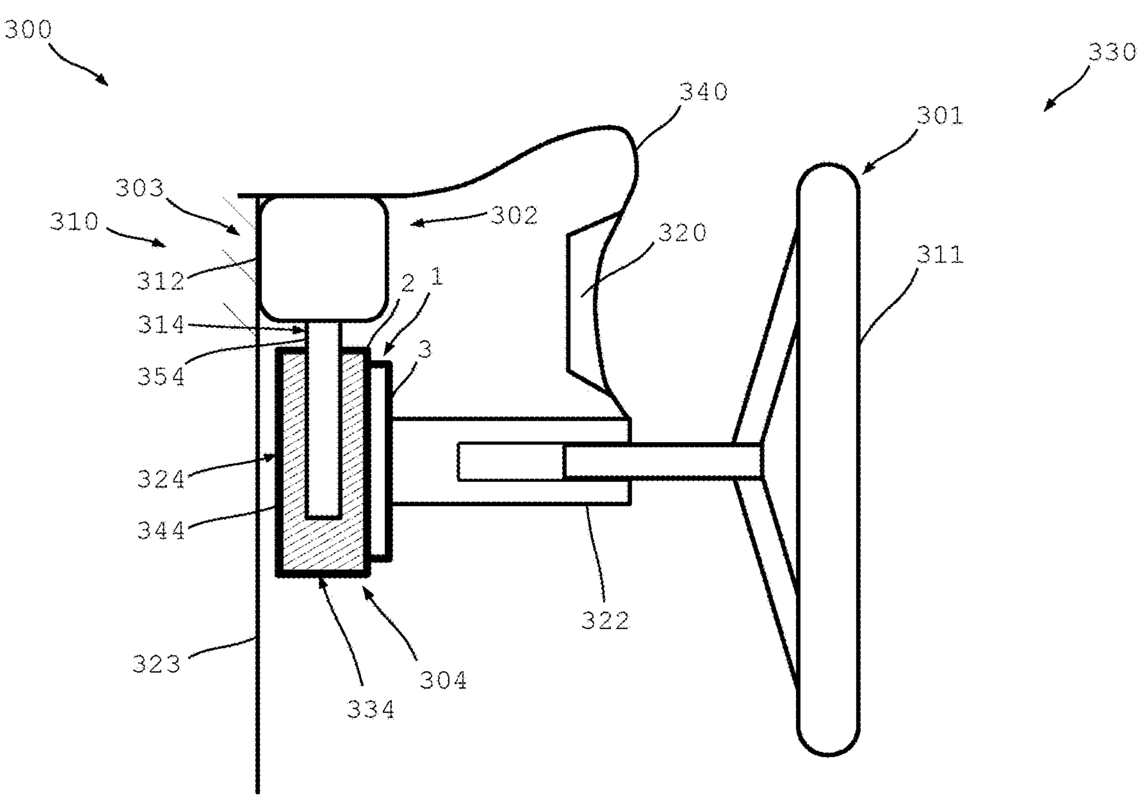

In the steering input device 300 shown in FIG. 7, the steering unit 301 can be retracted during autonomous ferry operation. For this purpose, the steering shaft 322 is designed here as a form-fitting sliding shaft, in which, for example, two shaft parts can be pushed telescopically into one another.

The drive device 302 and the coupling device 1 are here within or arranged below a cockpit structure 340, in which the instrument panel 320 is also arranged. The drive device 302 and the clutch device 1 are located in the forward direction of travel and partially below the instrument panel 320. For example, the drive device 302 and the coupling device 1 are arranged in the area of a bulkhead 323. The bulkhead 323 can serve as an abutment structure 313.

As a result, they are spaced so far from the steering unit 301 that there is sufficient space for the steering unit 301 to retract in autonomous ferry operation. In addition, the steering unit 301 can be pulled away from the driver's seat particularly safely in the event of a fault, since the drive device 302 and the coupling device 1 do not have to be moved.

Figure 8:
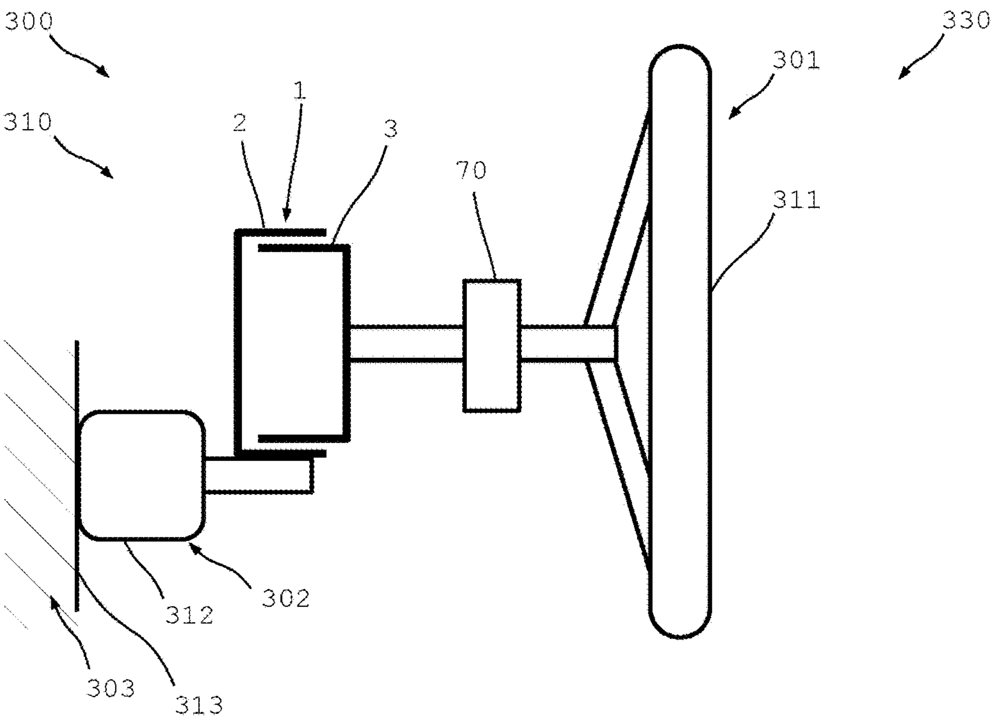

FIG. 8 shows an embodiment of the steering control device 300, in which the drive motor 312 is attached to the abutment structure 313 and drives the clutch component 2 directly. For example, an external toothing is applied to the clutch component 2 and the drive motor 312 has a matching gear. The drive motor 312 can be with or without reduction. Two or more drive motors 312 can also be used (redundancy; identical parts for higher torque).

Figures 9, 10, 11:
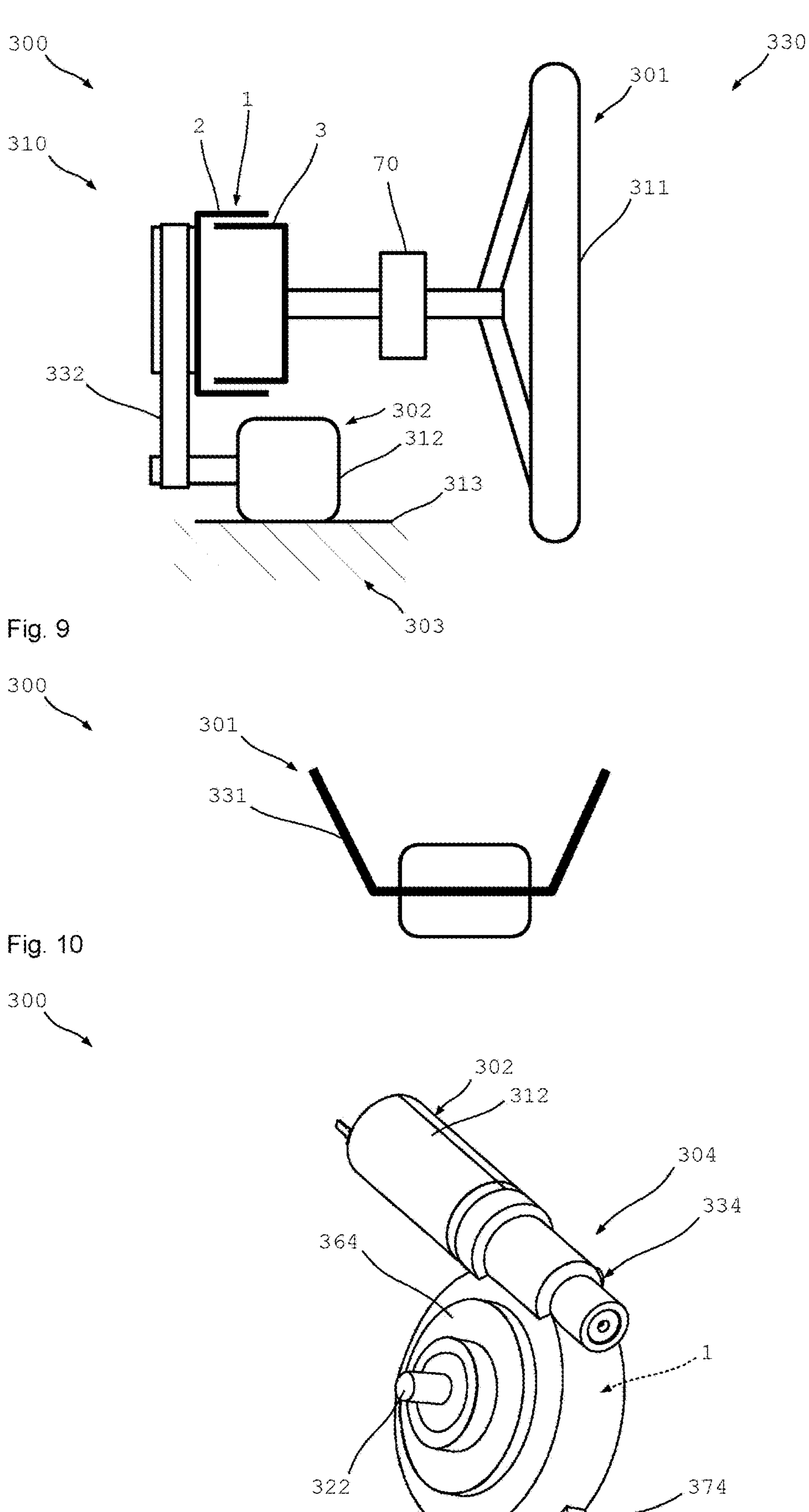
FIG. 10 shows a purely schematic detailed representation of a steering unit of the steering input device.
FIG. 11 shows a purely schematic representation of another steering control device according to the invention in a perspective view.

FIG. 9 shows an embodiment of the steering input device 300, the basic structure of which is analogous to the steering input device 300 shown in FIG. 8. However, here the drive motor 312 drives the clutch component 2 via a belt drive with a belt 332. As an alternative to the belt drive, another type of transmission can also be provided. The other clutch component 3 acts here directly on the steering shaft 322.

The clutch device 1 is used in the steering input devices 300 shown here e.g., controlled in such a way that the power flow between the drive device 302 and the steering unit 301 can be changed while the drive device 302 actively moves the steering unit 301 or while the drive device 302 actively pushes against a manual movement. The drive torque of the drive motor 312 is engaged or disengaged particularly gently and can also be varied in a targeted manner at the same time. Overall, the steering behavior can be influenced much more precisely and quickly.

The power flow between the drive device 302 and the steering unit 301 can also be changed while the drive device 302 with the self-locking gear device 304 supports the torque of a manual movement of the steering unit 301. This makes the steering unit 301 stronger or braked more weakly without the drive motor 312 having to be active. This saves energy.

For particular steering precision and to save energy, the clutch device 1 only establishes the power flow between the drive device 302 and the steering unit 301 when the drive motor 312 has reached a minimum speed. For example, the drive motor 312 is started without a frictional connection between the clutch components 2, 3 (i.e., with the clutch open). After reaching a certain speed, the adhesion between the clutch components 2, 3 is then slowly increased or immediately set to a maximum value.

In addition, the power flow with the clutch device 1 can be regulated so that torque fluctuations and speed ripples of the drive motor 312 are compensated for. For this purpose, the adhesion between the two clutch components 2, 3 can be continuously increased and decreased while the drive motor 312 is running, so that the transferable torque can be adjusted in a targeted manner and fluctuations can be compensated for.

When the drive motor 312 is active, e.g., the maximum adhesion between the clutch components 2, 3 can be set and thus the maximum transferable torque will be passed on to the steering unit 301. When the drive motor 312 is running, the adhesion between the clutch components 2, 3 can also be separated considerably more quickly than would be possible by adjusting the speed of the drive motor 312.

In addition, haptic feedback can be generated by specifically changing the force between the coupling components 2, 3. The feedback is e.g., noticeable as a vibration on the steering wheel. In this way, the driver can be informed, for example, of an unfavorable driving style, a dangerous situation or detected tiredness or the like.

The power and signal supply to the coupling device can be via Cables, slip rings, clock springs, radio or inductive, but are not limited to.

Figure 12:
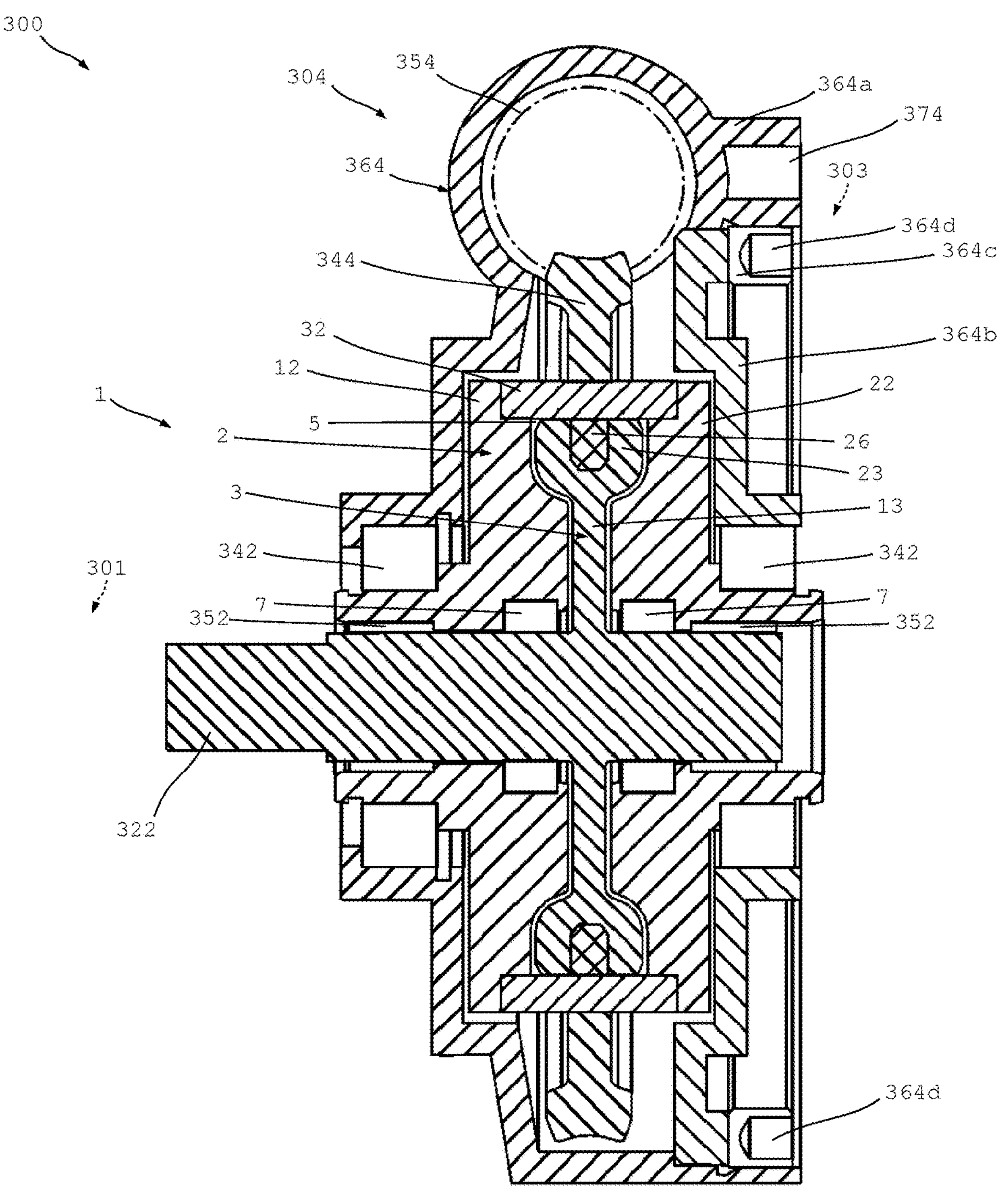
FIG. 12 shows the steering control device from FIG. 11 in a sectioned side view.

FIGS. 11 and 12 show an embodiment of the steering control device 300 according to the invention with a gear device 304 designed as a worm gear 334. The worm gear 334, the drive device 302 (in particular its drive motor 312) and the clutch device 1 are accommodated in a common housing device 364. The functional connection of the individual components is essentially analogous to the diagram shown in FIG. 3. The design shown here has the advantage that it is particularly compact and at the same time can be mounted very easily in a vehicle 330.

The steering shaft 322 is here rotatably accommodated in the housing device 364 and extends out of the housing device 364 so that, for example, the steering unit 301 (not shown here) can be attached to it. The housing device 364 can be mounted on the abutment structure 313 (not shown here) of the vehicle 330 via appropriate fastening means 374 and supported in a rotationally fixed manner. Alternatively, the steering input device 300 can be installed in a vehicle 330 analogously to the diagram shown in FIG. Then the steering unit 301 is mounted in a rotationally fixed manner on the housing device 364 via the fastening means 374. The steering shaft 322 is then connected to the abutment structure 313 in a rotationally fixed manner. In both cases, only the electrical or electronic connection needs to be made in order to install the steering control device 300 during vehicle assembly.

The housing device 364 here comprises two housing units 364*a*, 364*b* that are connected to one another. This makes installation easier and allows easy access for maintenance work. In the exemplary embodiment, the housing device 364 includes a fastening ring 364*c* having an external thread for fastening the housing unit 364*b* the housing unit 364*a*, which has an internal thread. In the exemplary embodiment, the fastening ring 364*c* has holes 364*d* for assembly with a face wrench. Other generally known types of fastening for connecting the housing unit 364*b* to the housing unit 364*a* are also conceivable and possible. However, the housing device 364 can also be equipped in one piece or with three or more housing units.

As can be clearly seen in FIG. 12, the worm wheel 344 and the worm shaft 354 are located inside the housing device 364. Radially inside the worm wheel 344 are the coupling components 2, 3 and the gap 5 formed between them with the magnetorheological medium 6 (not visible here). To prevent the medium 6 from escaping from the gap 5, a seal 7 is arranged on both axial sides of the second coupling component 3.

The first coupling component 2 is rotatably mounted on the housing device 364 here. For this purpose, two bearings 342 designed, for example, as rolling bearings are provided here. The steering shaft 322 is rotatably mounted on the first clutch component 2. For this purpose, two bearings 352 designed, for example, as plain bearings are provided here.

Overall, the result is that the steering shaft 322 and the coupling components 2, 3 are rotatably mounted in the housing device 364.

The second clutch component 3 is connected to the steering shaft 322 in a rotationally fixed manner. The second clutch component 2 is thus rotatably mounted on the first clutch component 2 indirectly via the steering shaft 322. The clutch component 3 and the steering shaft 322 are formed in one piece here. However, it is also possible for the clutch component 3 and the steering shaft 322 to be designed as separate and non-rotatably connected components.

The second coupling component 3 here comprises a disk element 13 and a coil receptacle 23 formed radially on the outside of the disk element 13. The coil receptacle 23 is located Coil device 26 for influencing the magnetorheological medium 6.

The first coupling component 2 here comprises two shell elements 12, 22 and a ring element 32, between which the second coupling component 3 extends. The worm wheel 344 is attached to the ring element 32. The worm wheel 344 can only be rotated together with the shell elements 12, 22 and the ring element 32.

When the worm wheel 344 is driven and the medium 6 is influenced in such a way that there is a frictional connection between the clutch components 2, 3, the clutch components 2, 3 and the steering shaft 322 as well as the steering unit 301 attached to it also rotate. If a manual force is exerted on the steering unit 301 and the medium 6 is influenced in such a way that there is a frictional connection between the clutch components 2, 3, the first clutch component 2 can be supported via the worm wheel 344 on the worm shaft 354 according to the principle of self-locking. Then very high forces can be absorbed, e.g., for exit assistance. In addition, by specifically influencing the medium 6, the adhesion between the coupling components 2, 3 and thus the mobility of the steering unit 301 can be adjusted from freely rotatable to blocked.

Figure 13:
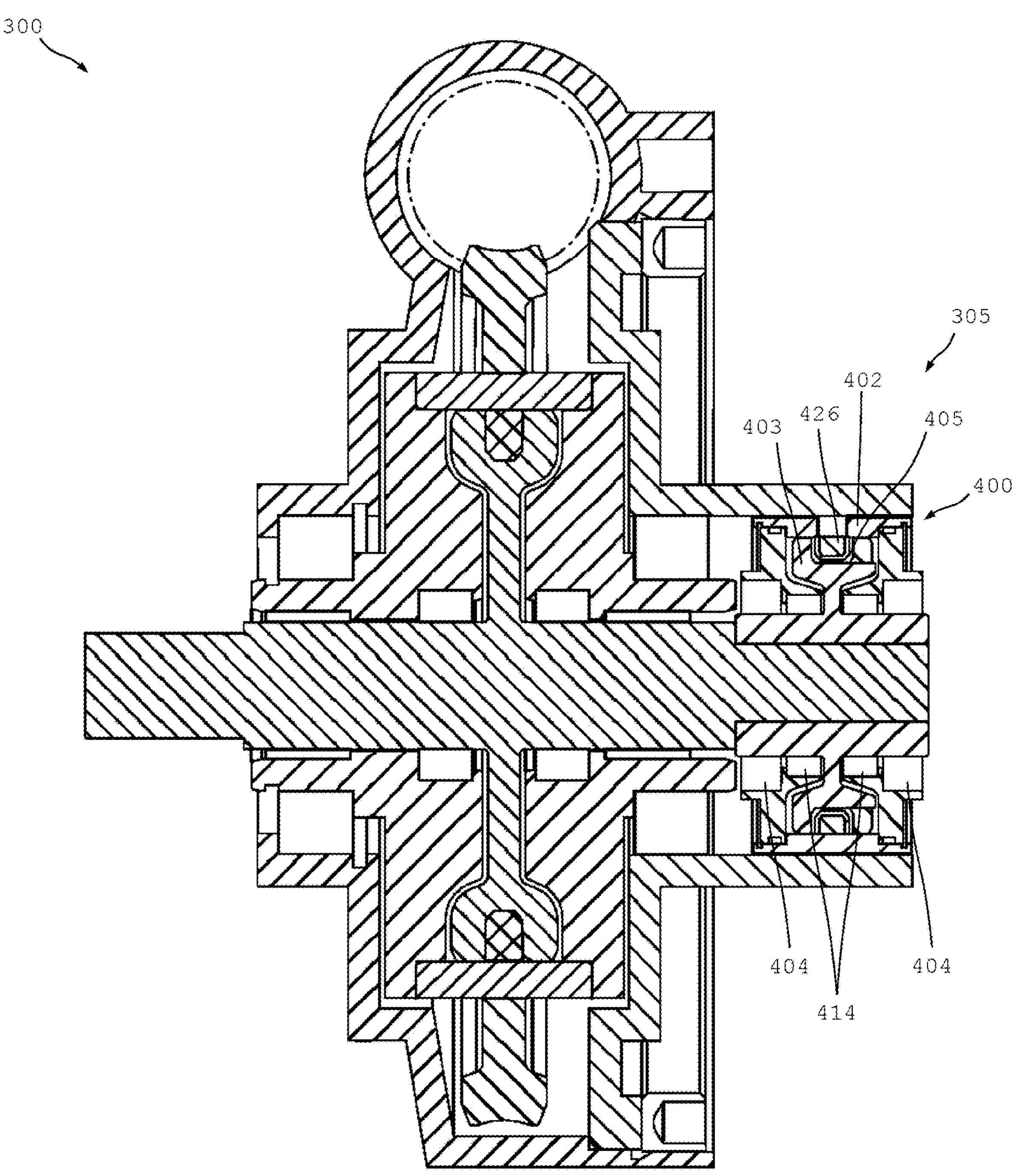
FIG. 13-18 show further developments of the steering control device of FIG. 11 with a fault protection in a sectioned side view.

The energy supply to the coil device 26 takes place here, for example, via the steering shaft 322 using sliding contacts and/or a coil spring. As an alternative to the arrangement shown here, the coil device 26 can also be attached to the first coupling component 2 and, for example, to the ring element 32. For example, one of the disk elements 12, 22 is then contacted via sliding contacts and/or a coil spring. It is also possible that the coil device 26 is arranged on the housing device 364 and is supplied with energy via this. FIG. 13 shows a further development of the steering input device 300 described with reference to FIGS. 11 and 12 with a fault protection device 305. The assembly of the housing device 364 and its cabling also results in the installation of the fault protection device 305. The malfunction protection 305 here comprises a braking device 400 accommodated in the housing device 364 with two brake components 402, 403 that can be rotated relative to one another. The braking device 400 can therefore also be referred to as an emergency brake. A gap 405 is formed between the brake components 402, 403, in which there is a magnetorheological medium, not shown here. If necessary, the medium can be influenced via a coil device 426 so that the brake components 402, 403 can rotate freely or are braked relative to one another. The coil device 426 can also be referred to as a fault coil unit. The gap 405 is sealed via seals 414.

The one brake component 402 is here attached to the housing device 364 in a rotationally fixed manner. The brake component 402 can thus be supported on the abutment structure 313 via the housing device 364. The other brake component 403 is connected to the steering shaft 322 in a rotationally fixed manner. The brake component 403 and the steering shaft 322 are rotatably mounted on the brake component 402 and thus also on the housing device 364 via bearings 404.

The coil device 426 is attached here to the brake component 402 and remains stationary in relation to the housing device 364. For example, it can be supplied with electrical energy via the housing device 364. Additionally or alternatively, an energy storage device 335, not shown here, can be accommodated in the housing device 364, which serves to supply the coil device 426.

The coil device 426 can be used to superimpose a magnetic field, not shown here Permanent magnet device 325 serve or be part of a remanence device. It is also possible for the coil device 426 to actively generate a magnetic field in the event of a malfunction and thereby influence the medium in the gap 405 in such a way that the desired braking torque is provided for the malfunction. In order to be independent of an energy supply to the clutch device 1 or of the vehicle 330, the braking device 400 is then preferably equipped with its own energy storage 335.

Figure 14:
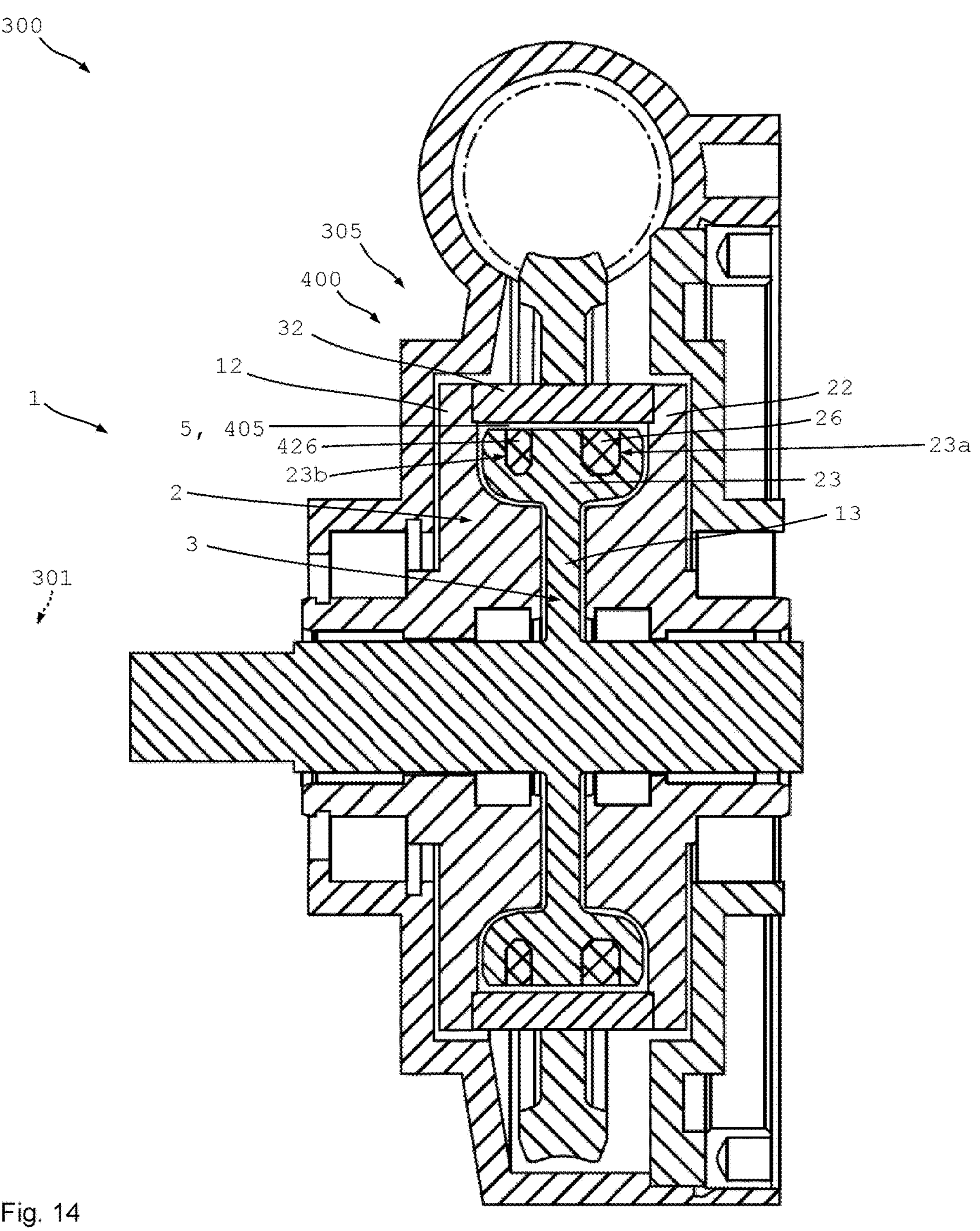

FIG. 14 shows a further development of the steering input device 300 described with reference to FIGS. 11 and 12, in which the malfunction protection 305 is particularly advantageously integrated. The coil holder 23 is here equipped with two receiving spaces 23*a*, 23*b*. The coil device 26 for the coupling device 1 is located in the receiving space 23*a*, which functions in the basic principle as previously described in FIGS. 12 and 13. The coil device 426 for the fault prevention is located in the second receiving space 23*b*. In the event of a fault, this coil device 426 provides the magnetic field to generate the desired braking torque.

By integrating the coil device 426 into the coil holder 23, the separate braking device 400 can be dispensed with. The gap 5 of the coupling device 1 also serves here as a gap 405 for the fault protection 305. The brake components 402, 403, which are designed separately in FIG. 13, are provided here by the clutch components 2, 3. The magnetic circuit of the coil device 426 extends through the coil holder 23 and from there through the common effective gap 5, 405 and further through the ring element 32.

In the event of a failure of the coil device 26 or Their power supply enables the coil device 426 to apply a defined braking effect (so-called emergency braking torque). The coil device 426 has this has its own energy supply and is equipped, for example, with an energy storage device (battery or rechargeable battery, capacitor or the like).

During normal operation, the coil device 426 can provide support in addition to the regular coil device 26, so that a stronger magnetic field or higher torque can be transmitted if necessary. This can be done, for example, if the steering unit is to be blocked to hold it when getting in or out.

Figure 15:
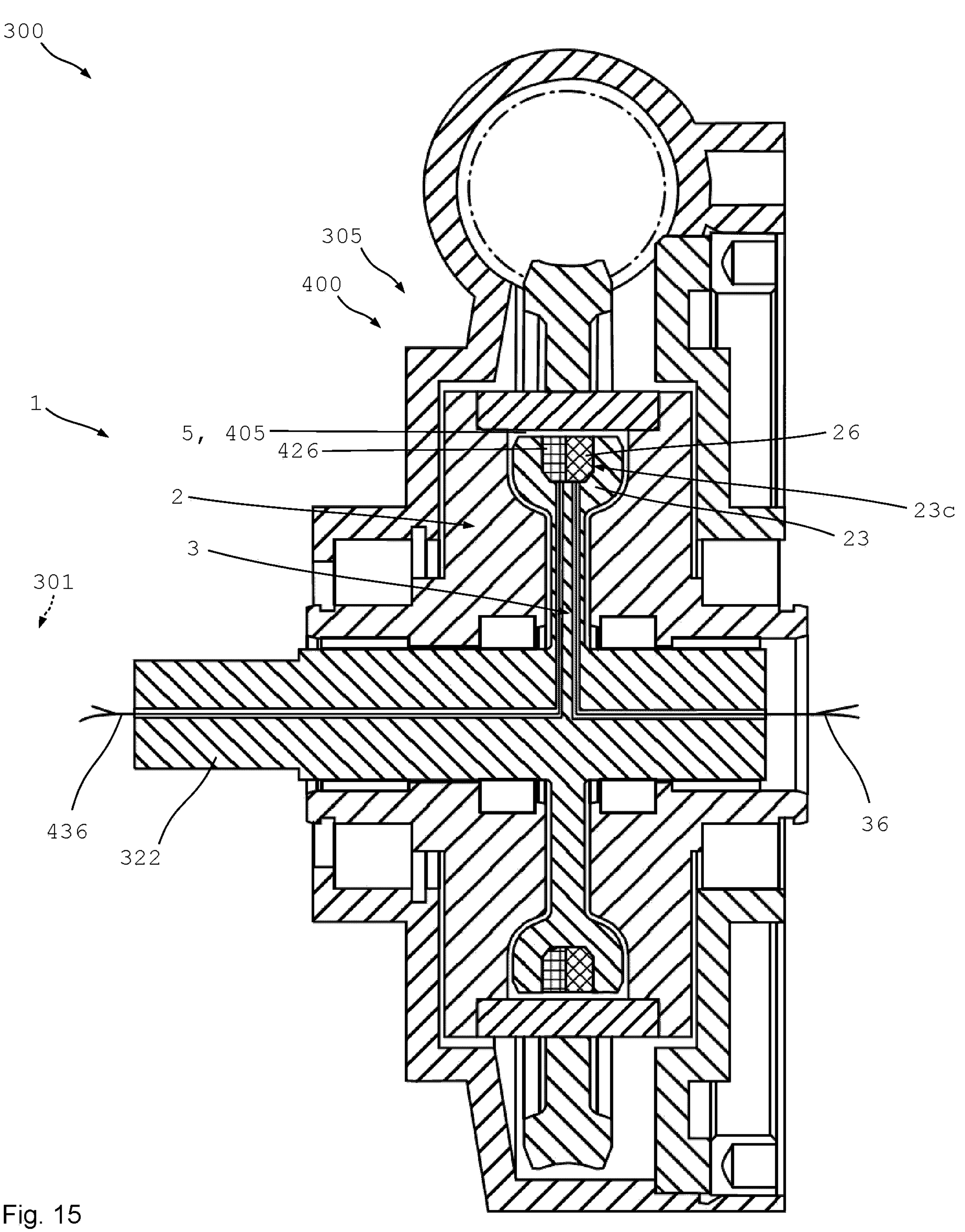

FIG. 15 shows an integration of the fault protection 305, in which both coil devices 26, 426 are accommodated in a common receiving space 23*c* of the coil holder 23. The two coil devices 26, 426 act here in the same gap 5, 405 and essentially use the same magnetic circuit. The energy is supplied via a separate supply line 36, 436. The supply lines 36, 436 emerge from the steering shaft 322 on opposite axial end faces. In this way, the probability of a simultaneous failure of both supply lines 36, 436 can be further reduced.

During normal operation, the coil device 26 can be supported by the coil device 426, so that the transferable torque is increased. In the event of a malfunction or a failure of the coil device 26, the coil device 426 generates the desired malfunction braking torque, so that the steering unit 301 cannot be rotated without resistance and is also not blocked.

If the coil device 26 is permanently energized due to a fault, a counter-rotating magnetic field can be generated with the coil device 426. As a result, the coil device 426 counteracts the coil device 26 and reduces or eliminates its magnetic field. This reliably prevents blocked or stiff steering.

The coil devices are in the version shown here 26, 426 axially next to each other in the common receiving space 23*c*. A magnetically conductive section between the two coil devices 26, 426 can thereby be dispensed with (as is provided, for example, in the embodiment according to FIG. 14). However, it is also possible for the coil devices 26, 426 to be arranged coaxially to one another (for example analogous to the arrangement shown in FIG. 21). It is also possible for the coil devices 26, 426 to be wound into one another (similar to the structure shown in FIG. 22).

Figure 16:
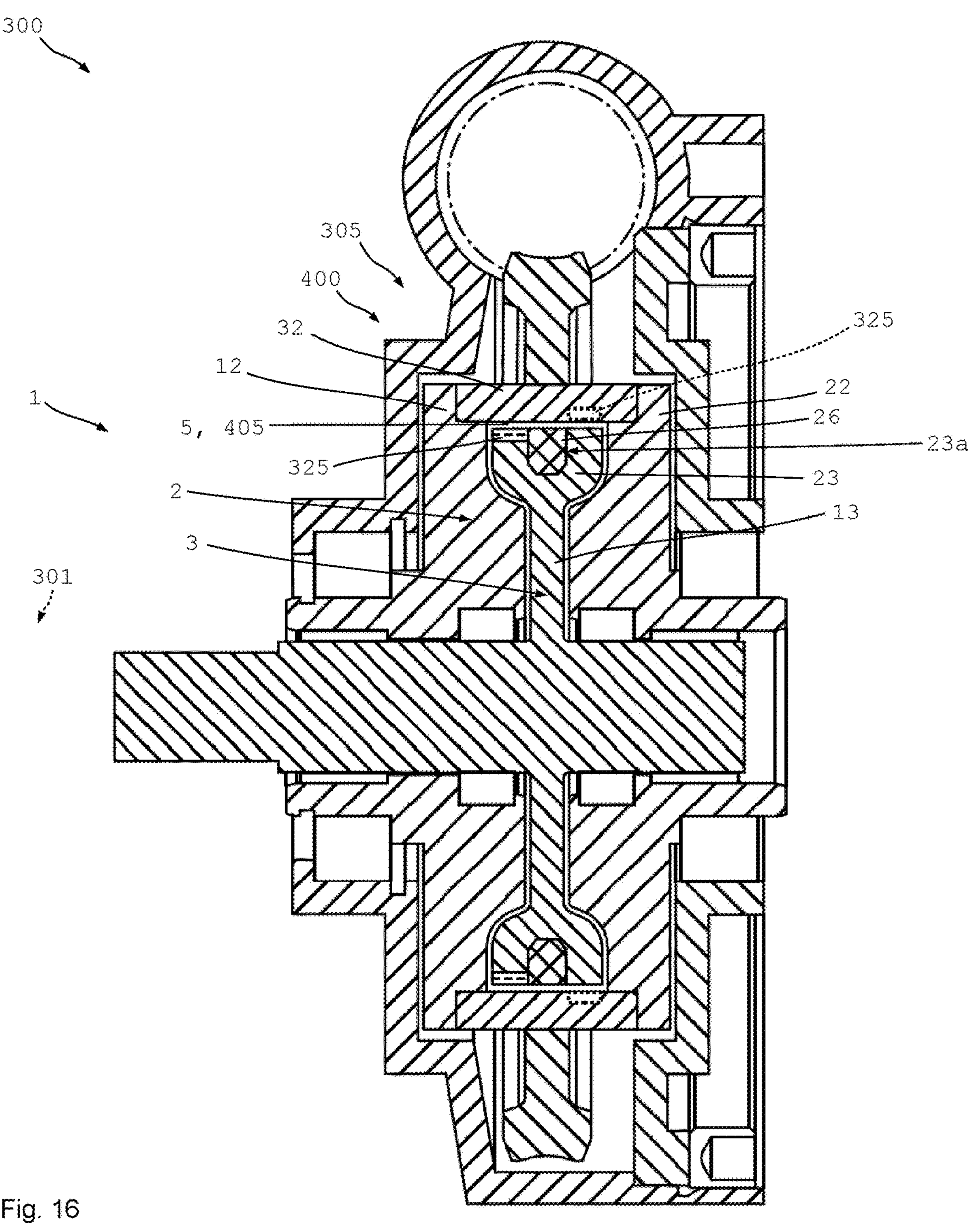

FIG. 16 shows an integration of the fault protection system 305, in which the emergency braking torque is provided by a magnetic field of a permanent magnet device 325. The permanent magnet device 325 offers the advantage that the magnetic field can be provided completely independently of the energy supply in the event of an malfunction. In addition, the coil device can be dispensed with. The permanent magnet device 325 is here integrated into the coil holder 23 and, for example, arranged axially next to the coil device 26.

For example, the permanent magnet device 325 is annular and equipped with radial polarization (i.e., it is magnetized radially). Other suitable types of magnetization are also possible. The permanent magnet device 325 can also be provided by a remanence device.

Alternatively or additionally, the permanent magnet device 325 can be arranged on the opposite side of the gap 5, 405 in the coupling component 2 (as shown here in dashed lines). For example, the permanent magnet device 325 can be arranged in the ring element 23 and/or in the worm wheel 344.

The permanent magnet device 325 is designed so that its magnetic field generates a defined emergency braking torque. In order to achieve the lowest possible basic torque, the effect of the permanent magnet device 325 is specifically canceled in normal operation. This is done by generating a correspondingly opposing magnetic field using the coil device 26.

Figure 17:
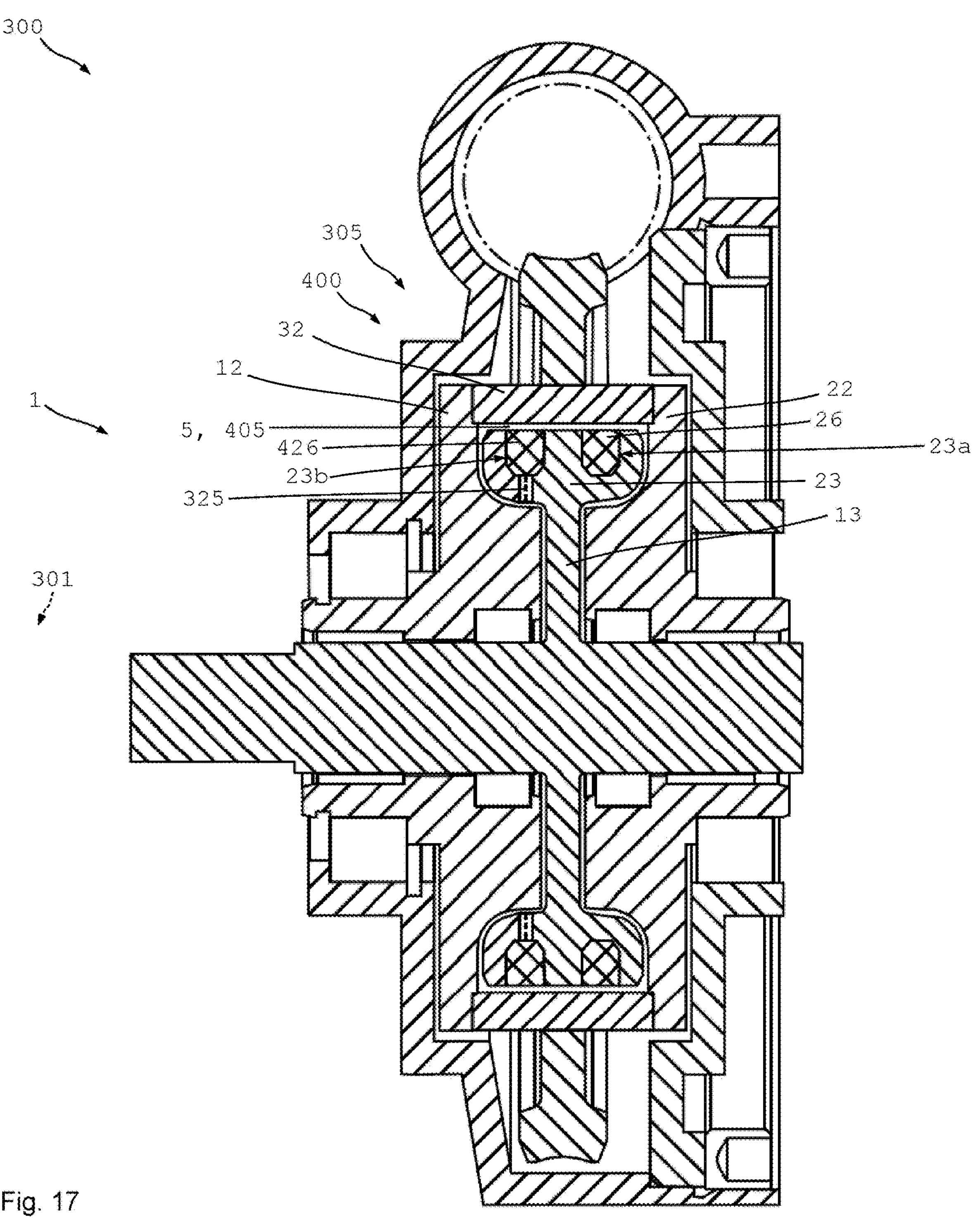

In FIG. 17, the fault protection device 305 is equipped with a permanent magnet device 325 and its own coil device 426. This is located in a separate receiving space 23*b*. With the coil device 426, the magnetic field of the permanent magnet device 325 can be adjusted in normal operation or be canceled if necessary. It is also possible for the permanent magnet device 325 to support the magnetic field of the coil device 26. The permanent magnet device 325 is designed here in a ring shape and has axial polarization (it is axially magnetized).

Figure 18:
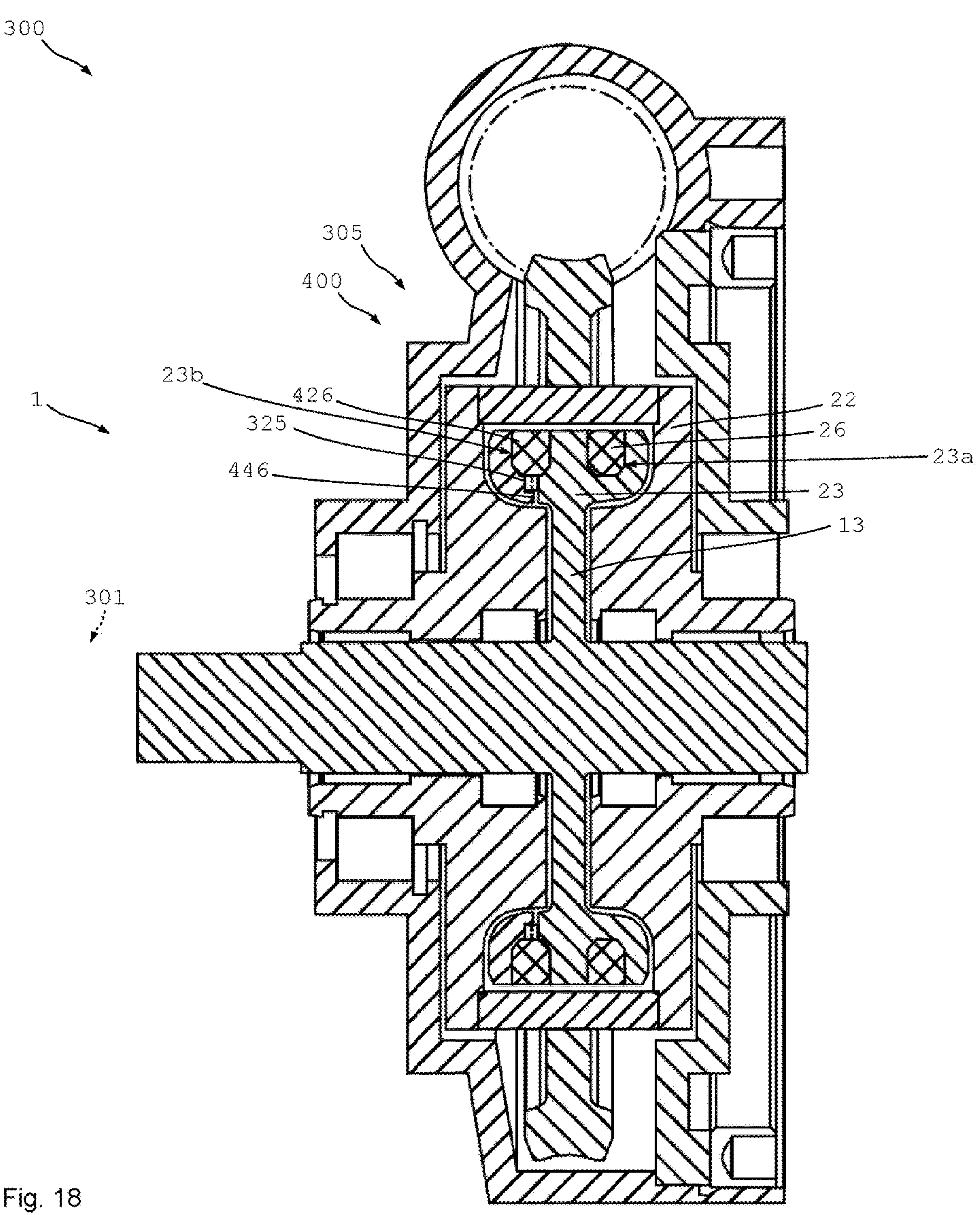

FIG. 18 shows a variant of the embodiment according to FIG. 17, in which the permanent magnet device 325 is designed with a smaller cross-sectional area, so that it is overall more compact and lighter. Due to the smaller cross-sectional area, the permanent magnet device 325 only extends through part of the coil holder 23. In order to prevent a magnetic short circuit, a magnetic flux barrier 446 and, for example, an air gap is arranged here radially within the permanent magnet device 325. Without the flux barrier 446, the permanent magnet device 325 would have no or insufficient effect in the gap 5, 405.

Figure 19:
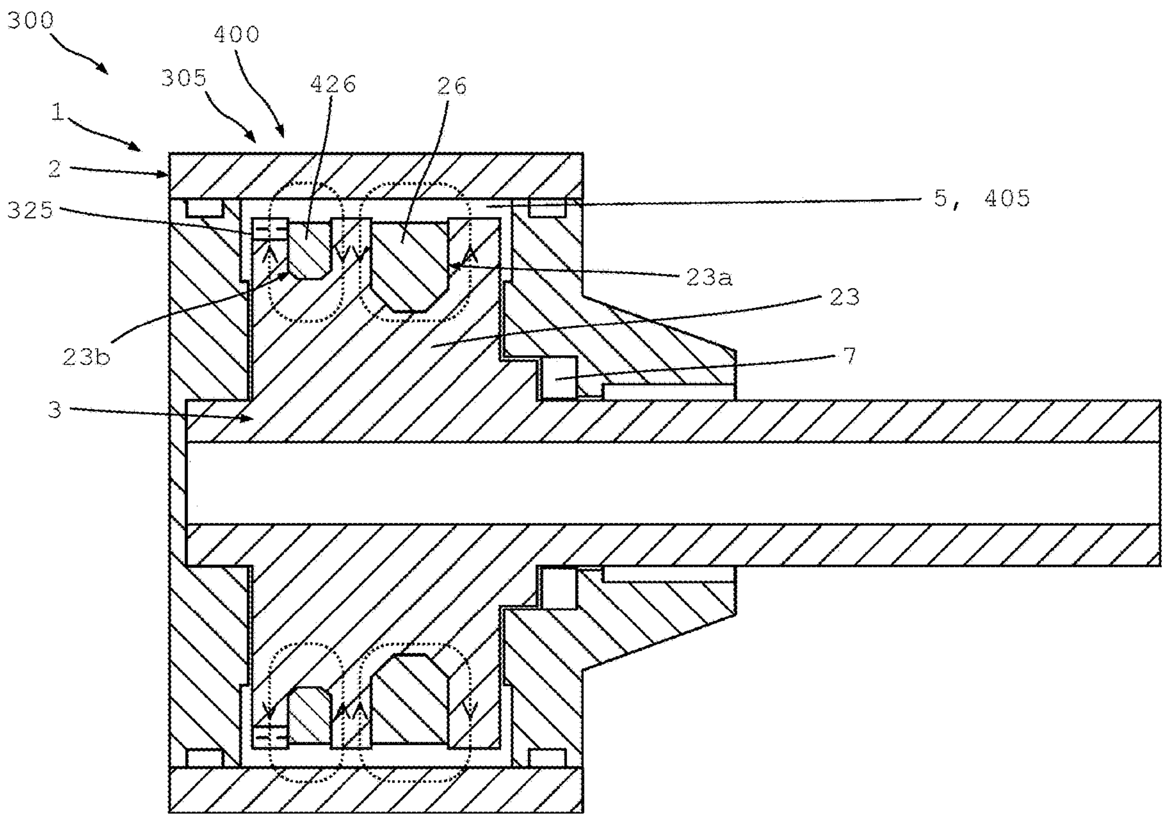
FIG. 19 shows a purely schematic detailed representation of a coupling device for the steering control device in a sectioned side view.

FIG. 19 shows a clutch device 1 with integrated fault protection 305, which can be arranged particularly well spatially separated from the drive device 302 and the transmission device 304 in the power train 310. Such steering input devices 300 are shown, for example, in FIGS. 1 and 2 as well as 5. For example, the coupling component 2 can be coupled to the steering unit 301 in a rotationally fixed manner. The clutch component 3 is then connected Drive device 302 or the transmission device 304 is coupled. A reverse connection is also possible.

Analogous to the coupling devices 1 described above, a gap 5 is also formed here between the coupling components 2, 3 and filled with the magnetorheological medium 6 (not shown). The internally arranged coupling component 3 is equipped with the coil holder 23, which here has two receiving spaces 23*a*, 23*b*. The coil device 26 for operating the coupling device 1 is arranged in the receiving space 23*a*. The coil device 426 of the fault protection device 305 is located in the receiving space 23*b*.

The brake components 402, 403 of the braking device 400 for the fault protection system 305 are provided here by the clutch components 2, 3. In addition, the gap 5 is identical to the gap 405 for the fault protection system 305. The gap 5, 405 is sealed to the outside via a seal 7. The magnetic circuits are shown here with dashed lines.

The magnetic field for the emergency braking torque is generated by a permanent magnet device 325. To cancel the fault braking torque in normal operation, the magnetic field of the permanent magnet device 325 is specifically superimposed with a magnetic field of the coil device 426.

Alternatively, the malfunction protection 305 shown here can also be equipped without the permanent magnet device 325. Then the emergency braking torque is generated with the coil device 426. For this purpose, the coil device 426 is, for example, equipped with its own separate energy supply (own energy storage and/or separate supply line).

Figure 20:
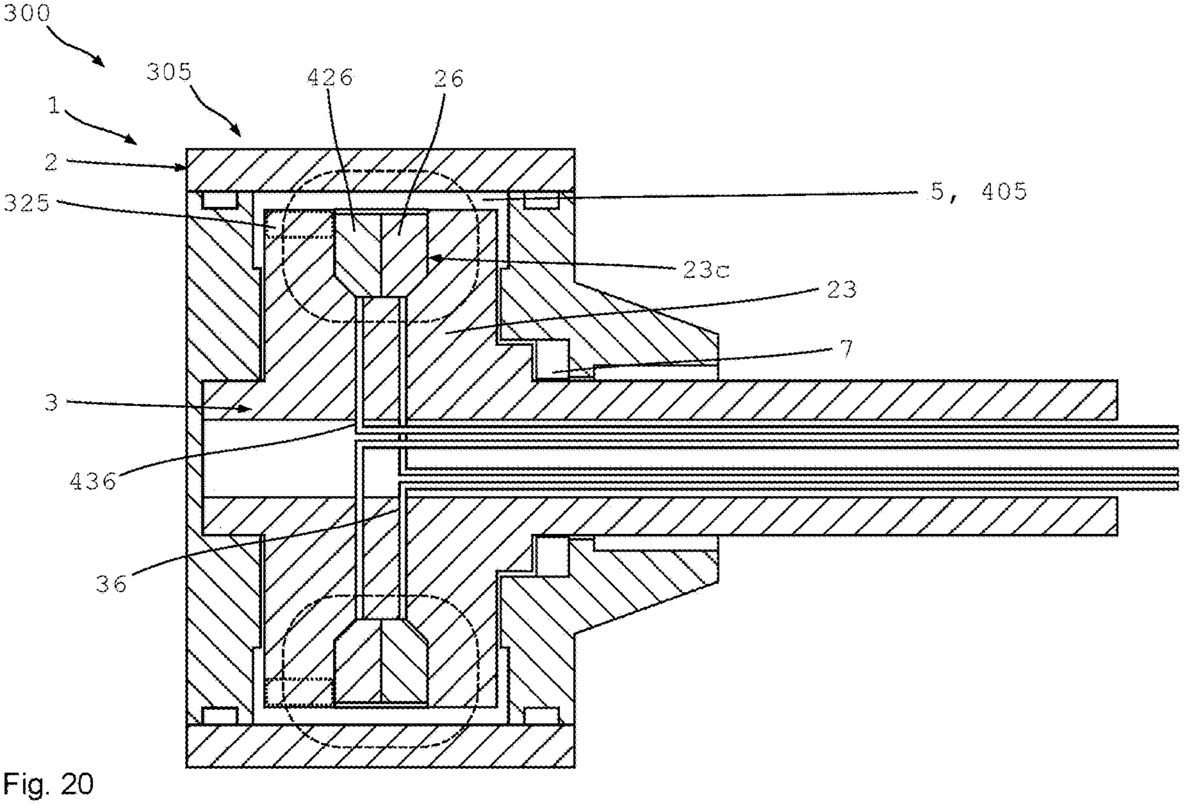
FIG. 20 shows another coupling device in a sectioned side view.

FIG. 20 shows a variant of the coupling device 1 according to FIG. 19, in which the coil devices 26, 426 are accommodated in a common receiving space 23*c*. The coil device 426 can be used to generate the magnetic field in the event of an malfunction. The common magnetic circuit is here shown in dashed lines.

However, it is also possible for the magnetic field to be provided in the event of a fault by means of a permanent magnet device 325, shown here in dashed lines. Then, in normal operation, the coil device 426 serves to cancel or weaken the magnetic field of the permanent magnet device 325. The coil devices 26, 426 are each equipped with their own supply line 36, 436. The coil devices 26, 426 are arranged axially next to one another in the receiving space 23*c*.

Figure 21:
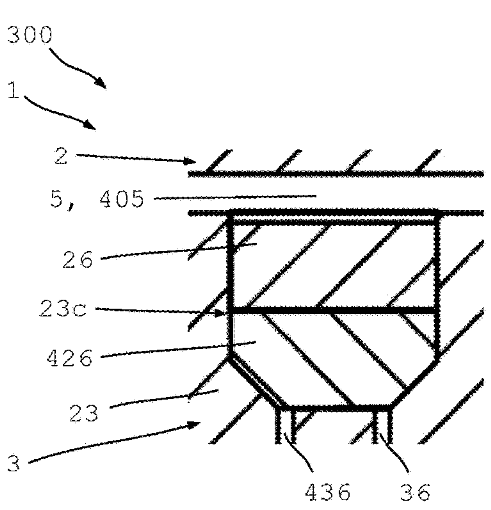
FIG. 21-22 shows detailed representations of embodiments of the coupling device according to FIG. 20.

FIG. 21 shows an alternative arrangement of the coil devices 26, 426 for the coupling device 1 of FIG. 20. A coaxial arrangement is provided here, in which the coil device 26 is located radially on the outside and the coil device 426 is located radially on the inside. If necessary, a reverse arrangement can also be provided.

Figure 22:
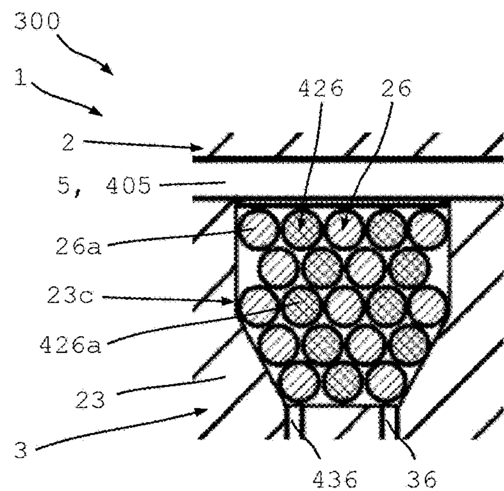

In FIG. 22, the coil devices 26, 426 are wound into one another and housed in the common receiving space 23*c*. The coil devices 26, 426 each have at least one electrically insulated conductor 26*a*, 426*a*. During production, both conductors 26*a*, 426*a* were simultaneously wrapped in the receiving space 23*c*, resulting in the multiple winding shown here.

Figure 23:
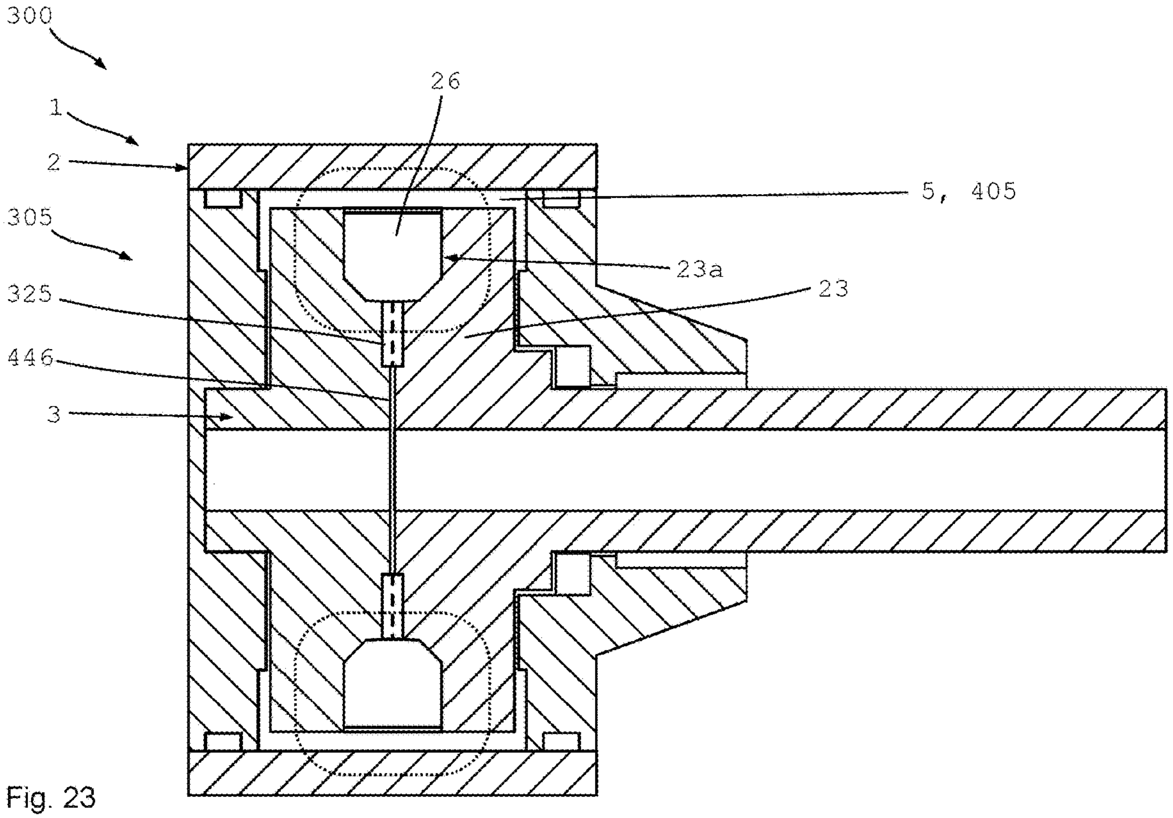
FIG. 23 shows another coupling device in a sectioned side view.

FIG. 23 shows a clutch device 1 in which the failure protection 305 has a permanent magnet device 325 which is arranged radially inside the coil device 26. In addition to its function for the clutch, the coil device 26 also serves to weaken or cancel the magnetic field of the permanent magnet device 325 during normal operation. The permanent magnet device 325 is designed here as a ring magnet which extends radially inward only over a part of the clutch component 3. In order to prevent a magnetic short circuit, a magnetic field is therefore arranged radially inside the permanent magnet device 325. The magnetically conductive sections of the clutch components 2, 3 which protrude into the gap 5, 405 can be equipped with a circumferential contour so that a different gap height results in the circumferential direction. For example, a star contour or the like can be provided.

Figure 24:
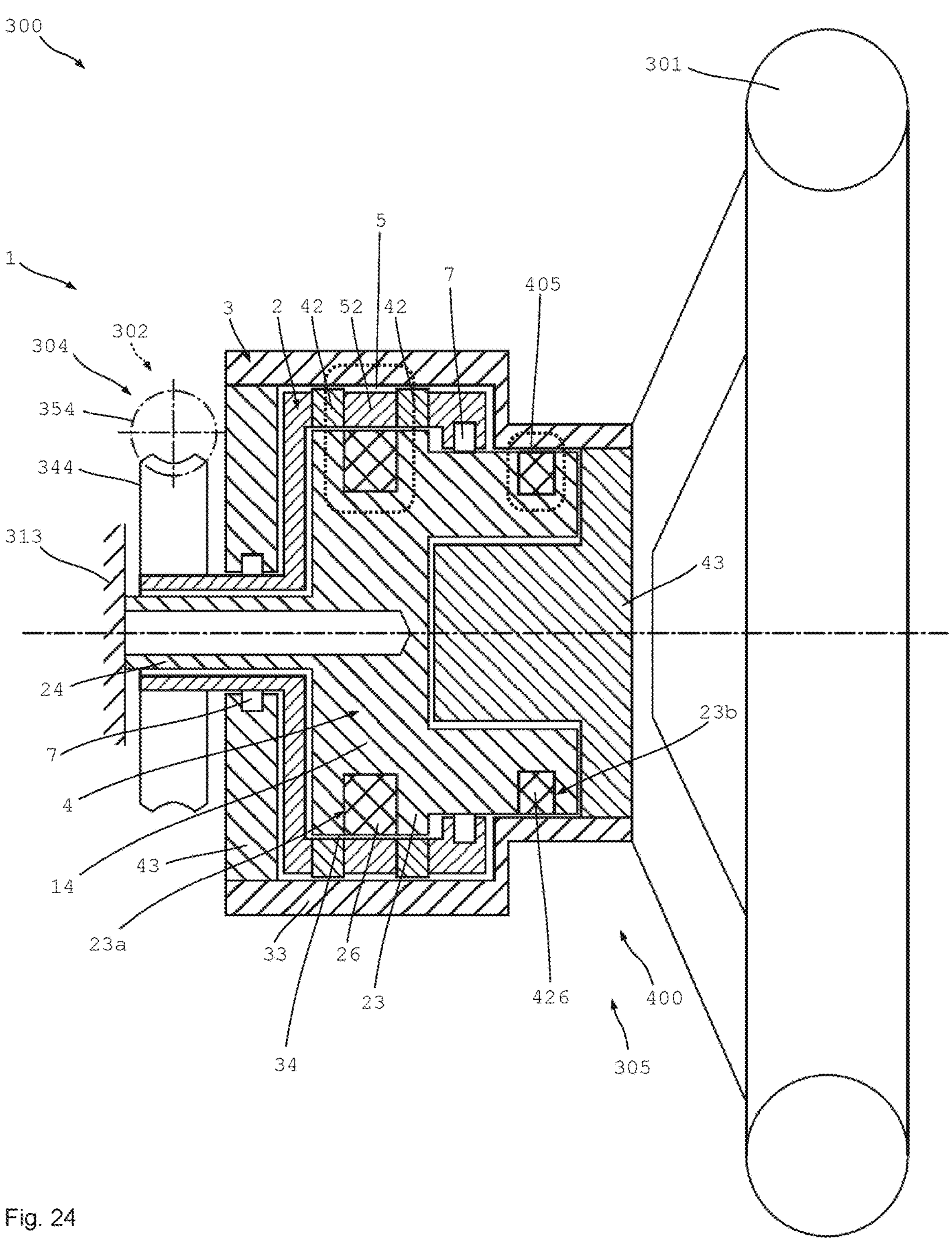
FIG. 24-25 show purely schematic representations of further steering control devices according to the invention in a sectioned side view.

FIG. 24 shows a particularly compact and reliable steering control device 300. The coupling components 2, 3 are arranged to be rotatable relative to a fixed component 4. The fixed component 4 is here non-rotatably attached to the abutment structure 313 and, for example, to the body. The fixed component 4 and the coupling components 2, 3 are arranged coaxially to one another. The component 4 is located radially inward and is coaxially surrounded by the coupling components 2, 3. The (inner) coupling component 2 is located between the fixed component 4 and the (outer) coupling component 3. A decoupling gap 34 is formed here between the inner coupling component 2 and the fixed component 4.

The steering unit 301 is here attached to the outer coupling component 3 in a rotationally fixed manner. In an alternative and also advantageous embodiment, the steering unit 301 can be attached to the fixed component 4 in a rotationally fixed manner, while the outer coupling component 3 is attached in a rotationally fixed manner to the torque support 303.

The drive device 302 is connected to the inner clutch component 2 via a gear device 304 designed as a worm gear 334. For this purpose, the worm wheel 344 is connected to the clutch component 2 in a rotationally fixed manner. The self-locking of the worm gear 334 thus acts on the inner clutch component 2.

The outer coupling component 3 here has a sleeve section 33 and two axial end sections 43. The component 4 here has a base body 14 and an axle extension 24 for connection to the abutment structure 313. The inner coupling component 2 here has a base body 52, which is equipped with magnetically conductive sections 42. In the area of the conductive sections 42, the gap 5 has a variable gap height in the circumferential direction. For this purpose, the conductive sections 42 are designed, for example, as a star contour or the like. The gap 5 with the magnetorheological medium 6 is located here between the two coupling components 2, 3 and is sealed by means of seals 7.

The coil device 26 is not arranged on the coupling device 1 but on the fixed component 4. For this purpose, the coil holder 23 with the receiving space 23*a* for the coil device 26 is formed in the base body 14 of the fixed component 4. Since the component 4 is fixed, a reliable energy supply to the coil device 26 can be implemented particularly inexpensively and reliably. Sliding contacts or coil springs are not necessary.

Due to this special arrangement of the coil device 26, its magnetic field extends through the fixed component 4 and through the decoupling gap 34 as well as through the conductive sections 42 of the inner coupling component 2 and further through the gap 5 and finally through the (conductive) outer coupling component 3. The magnetic circuit (shown in dashed lines) extends here over three components 2, 3, 4 that can be rotated relative to one another and over two gaps 5, 34. By means of the seal 7 arranged on the inner coupling component 2, the gap 5 and the decoupling gap 34 are sealed from one another. Apart from the seal 7, the gap 5 and the decoupling gap 34 merge into one another here.

The steering input device 300 shown here is equipped with a fault protection device 305, which comprises an (additional) coil device 426 for providing the fault braking torque. In one variant, the coil device 426 can also be used to strengthen the magnetic field of the coil device 26 in normal operation.

The coil device 426 is also housed in the fixed component 4. For this purpose, a separate receiving space 23*b* is formed in the base body 14. The clutch component 2 provides the brake component 402 and the clutch component 3 provides the brake component 403. The conductive sections running axially next to the coil device 426 can be designed here, for example, as a star contour or the like. For this purpose, the gap 405 can have a variable height in the areas of the fixed component 4 adjacent to the coil device 426. This results in e.g. Here too, for example, a star contour analogous to the conductive sections 42.

In the area of the coil device 426, the fixed component 4 and the outer coupling component 3 lie directly opposite each other (there is no inner coupling component 2 between them here). The gap 405 provided for the coil device 426 is located here directly between the component 4 and the outer coupling component 3. The gap 405 merges directly into the gap 5, so that in principle there is a common gap 5, 405 for the coupling device 1 and the fault protection system 305 is provided.

There is no need for the complex separation of two columns, each with its own medium. In addition, in the event of a fault, the braking effect is generated directly between the outer coupling component 3 (to which the steering unit 301 is attached) and the fixed component 4 (which is attached to the abutment structure 313 in a rotationally fixed manner).

Figure 25:
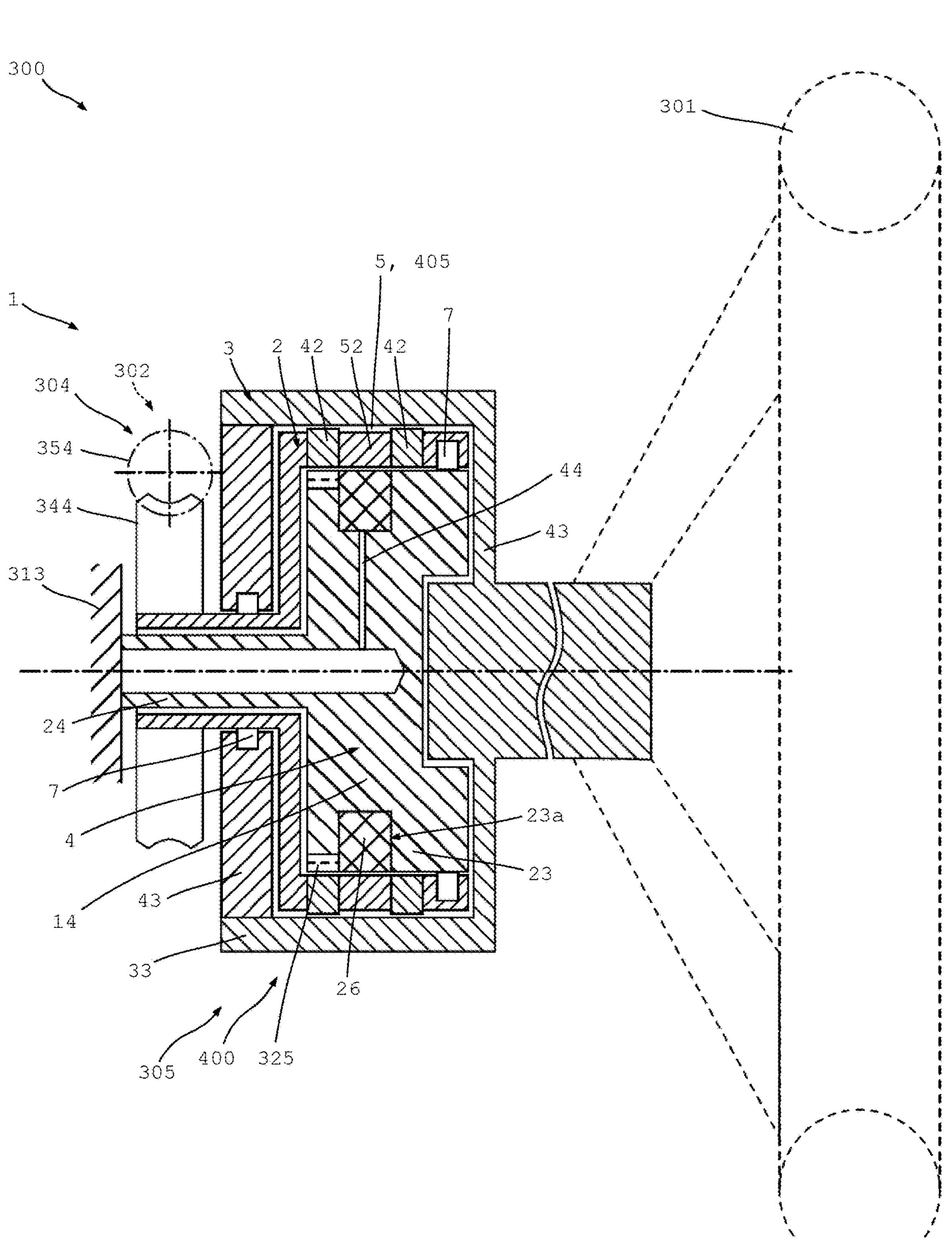

FIG. 25 shows a variant of the steering input device 300 presented with reference to FIG. 24. Malfunction protection 305 is here equipped with a permanent magnet device 325 for generating the malfunction braking torque. The permanent magnet device 325 is designed here in the shape of a ring and is arranged on the fixed component 4.

With the coil device 26, the magnetic field of the permanent magnet device 325 can be canceled or weakened if necessary. Additionally or alternatively, an additional coil device 426 can also be provided. This is then accommodated, for example, together with the coil device 26 in the receiving space 23*a* (so-called common receiving space 23*c*). The winding arrangement can, for example, be designed as described with reference to FIGS. 20 to 22.

In a variant, the coil device 426 can generate an opposite magnetic field that reduces or eliminates the magnetic field of the coil device 26. The advantage here is that the magnetic fields of the coil devices 26, 426 lie in a common magnetic circuit. The additional coil device 426 can be used to remedy excessive current supply to the coil device 26 in the event of a fault.

Clearly visible here is a channel 44, which is formed in the base body 14 and through which, for example, a supply line 36 of the coil device 26 can be guided.

| List of reference symbols: | |
|---|---|
| 1 | magnetorheological clutch device, coupling device |
| 2, 3 | clutch component, coupling component |
| 4 | fixed component |
| 5 | gap |
| 6 | medium |
| 7 | seal |
| 12 | shell element, disk element |
| 13 | disk element device |
| 14 | base body |
| 22 | shell element |
| 23 | coil holder |
| 23a | receiving space |
| 23b | receiving space |
| 23c | receiving space |
| 24 | axle extension |
| 26 | coil device |
| 26a | conductor |
| 32 | ring element |
| 33 | sleeve section |
| 34 | decoupling gap |
| 36 | supply line |
| 42 | conductive section |
| 43 | front section, axial end section |
| 44 | channel |
| 52 | base body |
| 70 | sensor device |
| 300 | steering input device |
| 301 | steering unit |
| 302 | drive device |
| 303 | torque support |
| 304 | gear device |
| 305 | fault protection device |
| 306 | steering lock |
| 307 | actuator device |
| 310 | power train |
| 311 | steering wheel |

-continued

| List of reference symbols: | |
| --- | --- |
| 312 | drive motor |
| 313 | abutment structure |
| 314 | drive member |
| 315 | locking bolt |
| 316 | blocking device |
| 320 | instrument panel |
| 321 | receiving space |
| 322 | steering shaft |
| 323 | bulkhead |
| 324 | output member |
| 325 | permanent magnet device |
| 330 | vehicle |
| 331 | control horn |
| 332 | belt |
| 334 | worm gear |
| 335 | energy storage device |
| 340 | cockpit structure |
| 342 | bearing |
| 344 | worm wheel |
| 352 | bearing |
| 354 | worm shaft |
| 364 | housing device |
| 364 | housing unit |
| 364b | housing unit |
| 364c | fastening ring |
| 364d | bore |
| 374 | fasteners |
| 400 | braking device |
| 402 | brake component |
| 403 | brake component |
| 404 | bearings |
| 405 | gap |
| 414 | seal |
| 426 | coil device |
| 426a | conductor |
| 436 | supply line |
| 446 | flux/flow barrier |

The invention claimed is:

1. A steering input device for controlling a steering movement, the steering input device comprising:

at least one power train having at least one movable steering unit and at least one drive device having at least one drive motor for generating a torque acting on the at least one movable steering unit, and the at least one movable steering unit being movable by the drive device;

the power train having at least one controllable magnetorheological coupling device, the at least one controllable magnetorheological coupling device having at least two coupling components that can be rotated relative to one another;

the at least one controllable magnetorheological coupling device being connected in series to the drive device in the power train, and the at least one controllable magnetorheological coupling device being configured to control a torque transmitted between the drive device and the at least one movable steering unit; and when the drive device generates a torque, the torque being transmitted to the at least one movable steering unit, via the at least one controllable magnetorheological coupling device, such that the at least one controllable magnetorheological coupling device controls how much torque is transmitted to the at least one movable steering unit.

2. The steering input device according to claim 1, wherein the at least one movable steering unit can only be moved together with at least one of the at least two coupling components.

3. The steering input device according to claim 1, wherein:

a manual movement of the at least one movable steering unit is configured to be acted upon with a torque that counteracts the manual movement;

the torque that counteracts the manual movement can be adjusted by the at least one controllable magnetorheological coupling device; and the drive device is configured as a torque support for the at least one controllable magnetorheological coupling device.

4. The steering input device according to claim 1, wherein:

the drive device has at least one transmission which can be driven by the drive motor; and the transmission is self-locking, such that the transmission can receive a torque from the drive motor and pass the torque on to the at least one controllable magnetorheological coupling device, but cannot move the drive motor.

5. The steering input device according to claim 4, wherein:

the transmission has at least one drive member driven by the drive motor and at least one output member driven by the drive member, the self-locking transmission is configured such that the drive member and the drive motor cannot be driven by the output member.

6. The steering input device according to claim 5, wherein at least one of the at least two coupling components is coupled in a rotationally fixed manner to the output member.

7. The steering input device according to claim 6, wherein the at least two coupling components coaxially overlap at least in sections with one another, and a radially outer coupling component is coupled in a rotationally fixed manner to the output member.

8. The steering input device according claim 7, wherein the drive device has at least two drive motors, the drive motors each having a drive member, and the drive members drive the same output member.

9. The steering input device according to claim 1, wherein the at least one controllable magnetorheological coupling device is arranged between the at least one movable steering unit and the drive device in the power train.

10. The steering input device according to claim 1, wherein one of the coupling components is connected in a rotationally fixed manner to the at least one movable steering unit, the other of the coupling components is configured to be driven by the drive device, and the drive device is connected on the vehicle side for torque support.

11. The steering input device according to claim 1, wherein the drive device is arranged between the at least one controllable magnetorheological coupling device and the at least one movable steering unit in the power train.

12. The steering input device according to claim 1, wherein one of the coupling components is connected to a vehicle side for torque support and the other of the coupling components is configured as a torque support for the drive device.

13. The steering input device according to claim 1, wherein the at least one movable steering unit has at least one receiving space, and the drive device and the at least one controllable magnetorheological coupling device are at least partially arranged in the receiving space.

14. The steering input device according to claim 1, wherein the drive device and the at least one controllable magnetorheological coupling device are arranged at least partially at a distance from the at least one movable steering unit, and the drive device and the at least one controllable magnetorheological coupling device are in an operational mounting position below and/or in the intended forward direction of travel in front of an instrument panel of a vehicle to be steered.

15. The steering input device according to claim 1, wherein the at least one movable steering unit is configured to be retractable at least for autonomous driving operation.

16. The steering input device according to claim 1, further comprising at least one fault protection system configured to apply a targeted torque to a mobility of the at least one movable steering unit in an event of a malfunction of the at least one controllable magnetorheological coupling device such that the at least one movable steering unit is neither blocked nor can be moved without resistance.

17. The steering input device according to claim 16, wherein the fault protection system mechanically couples the coupling components to one another in the event of a malfunction such that between the coupling components a minimum friction occurs and/or the coupling components are connected in a rotationally fixed manner.

18. The steering input device according to claim 17, wherein:

- the fault protection system has at least one permanent magnet device;
- a magnetic field of the at least one permanent magnet is configured to brake the mobility of the coupling components with a defined torque; and
- the magnetic field of the permanent magnet device is configured to be reduced and/or amplified in normal operation by an electrical coil device.

19. The steering input device according to claim 16, wherein the fault protection system has at least one electrical energy storage for supplying energy to the at least one controllable magnetorheological coupling device in the event of a malfunction, and the energy storage is configured to provide energy for an electrical coil device to influence a magnetorheological medium.

20. The steering input device according to claim 19, wherein the energy storage is arranged within the at least one controllable magnetorheological coupling device.

21. The steering input device according to claim 1, further comprising at least one controllable steering lock for blocking a mobility of the at least one movable steering unit, and the steering lock being configured as an exit aid.

22. The steering input device according to claim 21, wherein the steering lock is provided by the at least one controllable magnetorheological coupling device, and the at least one controllable magnetorheological coupling device is configured to transmit a torque of more than 25 Nm to provide the steering lock.

23. The steering input device according to claim 22, wherein the steering lock has a blocking device, and the blocking device is configured to block the mobility of the at least one movable steering unit independently of the at least one controllable magnetorheological coupling device.

24. The steering input device according to claim 1, further comprising an actuator device for converting a steering movement carried out with the at least one movable steering unit into a vehicle movement, and wherein the at least one movable steering unit and the actuator device are operatively connected only according to the steer-by-wire concept in normal operation.

25. The steering input device according claim 1, further comprising a gap between the coupling components at least partially filled with a magnetorheological medium, and wherein the magnetorheological medium can be influenced by at least one magnetic field generated by an electrical coil device to control the mobility of the coupling components.

26. The steering input device according to claim 1, wherein a switching time of the at least one controllable magnetorheological coupling device is less than 10 ms.

27. The steering input device according to claim 1, wherein a basic torque of the at least one controllable magnetorheological coupling device is less than 0.1 Nm.

28. A method for operating a steering input device, the method comprising:

- providing a steering input device for controlling a steering movement, the steering input device having:
  - at least one power train having at least one movable steering unit and at least one drive device having at least one drive motor for generating a torque acting on the at least one movable steering unit, and the at least one movable steering unit being movable by the drive device,
  - the power train having at least one controllable magnetorheological coupling device, the at least one controllable magnetorheological coupling device having at least two coupling components that can be rotated relative to one another,
  - the at least one controllable magnetorheological coupling device being connected in series to the drive device in the power train, and the at least one controllable magnetorheological coupling device being configured to control a torque transmitted between the drive device and the at least one movable steering unit, and
  - when the drive device generates a torque, the torque being transmitted to the at least one movable steering unit, via the at least one controllable magnetorheological coupling device, such that the at least one controllable magnetorheological coupling device controls how much torque is transmitted to the at least one movable steering unit;
- changing a torque that is transmitted between the drive device and the at least one movable steering unit with the at least one controllable magnetorheological coupling device; and
- actively moving the at least one movable steering unit with the drive device and/or supporting the torque of a manual movement of the at least one movable steering unit with the drive device.

29. The method according to claim 28, wherein the at least one controllable magnetorheological coupling device enables the torque between the drive device and the at least one movable steering unit only after a start-up phase of the drive device.

30. The method according to claim 28, wherein the at least one controllable magnetorheological coupling device regulates the torque between the drive device and the at least one movable steering unit such that the torque fluctuations and/or a speed ripple of the drive device can be at least partially offset.

* * * * *